United States Patent
Sato

(10) Patent No.: US 11,107,251 B2
(45) Date of Patent: *Aug. 31, 2021

(54) IMAGE PROCESSING DEVICE AND METHOD

(71) Applicant: SONY CORPORATION, Tokyo (JP)

(72) Inventor: Kazushi Sato, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/896,766

(22) Filed: Jun. 9, 2020

(65) Prior Publication Data

US 2020/0320746 A1 Oct. 8, 2020

Related U.S. Application Data

(63) Continuation of application No. 13/264,320, filed as application No. PCT/JP2010/057127 on Apr. 22, 2010, now Pat. No. 10,755,444.

(30) Foreign Application Priority Data

Apr. 24, 2009 (JP) .................................. 2009-105937

(51) Int. Cl.
G06T 9/00 (2006.01)
H04N 19/105 (2014.01)
(Continued)

(52) U.S. Cl.
CPC .......... *G06T 9/004* (2013.01); *H04N 19/105* (2014.11); *H04N 19/117* (2014.11);
(Continued)

(58) Field of Classification Search
None
See application file for complete search history.

(56) References Cited

U.S. PATENT DOCUMENTS

2003/0202588 A1 10/2003 Yu et al.
2005/0243920 A1 11/2005 Murakami et al.
(Continued)

FOREIGN PATENT DOCUMENTS

CA 2676709 8/2008
CN 101115207 A 1/2008
(Continued)

OTHER PUBLICATIONS

Drugeon et al.: "Adaptive Multidirectional Intra Prediction", ITU Telecommunications Stnadardizatio Sector, Study Group 16, Question 6, 33rd Meeting: VCEG-AG05, Video Coding Experts Group (VCEG) pp. 1-6 (Year: 2007).*

(Continued)

*Primary Examiner* — Dave Czekaj
*Assistant Examiner* — Shanika M Brumfield
(74) *Attorney, Agent, or Firm* — Paratus Law Group, PLLC

(57) ABSTRACT

The present invention relates to an image processing device and method which enable encoding efficiency in intra prediction to be improved. In the event that the optimal intra prediction mode is mode 0, adjacent pixels to be used for prediction of the current block are pixels $A_0$, $A_1$, $A_2$, and $A_3$. According to these pixels and a 6-tap FIR filter, pixels $a_{-0.5}$, $a_{+0.5}$, and so on with ½ pixel precision are generated, and further, pixels $a_{-0.75}$, $a_{-0.25}$, $a_{+0.25}$, and $a_{+0.75}$ with ¼ pixel precision are generated by linear interpolation. Subsequently, the optimal shift amount is determined with a value of −0.75 through +0.75 that is phase difference between an integer pixel and generated fractional pixel precision serving as a candidate of the shift amount in the horizontal direction. The present invention may be applied to an image encoding device which performs encoding using the H.264/AVC system, for example.

13 Claims, 26 Drawing Sheets

(51) Int. Cl.
| | |
|---|---|
| H04N 19/159 | (2014.01) |
| H04N 19/176 | (2014.01) |
| H04N 19/61 | (2014.01) |
| H04N 19/117 | (2014.01) |
| H04N 19/154 | (2014.01) |
| H04N 19/182 | (2014.01) |
| H04N 19/82 | (2014.01) |
| H04N 19/523 | (2014.01) |
| H04N 19/40 | (2014.01) |
| H04N 19/44 | (2014.01) |
| H04N 19/52 | (2014.01) |
| H04N 19/11 | (2014.01) |

(52) U.S. Cl.
CPC ......... *H04N 19/154* (2014.11); *H04N 19/159* (2014.11); *H04N 19/176* (2014.11); *H04N 19/182* (2014.11); *H04N 19/40* (2014.11); *H04N 19/44* (2014.11); *H04N 19/523* (2014.11); *H04N 19/61* (2014.11); *H04N 19/82* (2014.11); *H04N 19/11* (2014.11); *H04N 19/52* (2014.11)

(56) References Cited

U.S. PATENT DOCUMENTS

| | | | |
|---|---|---|---|
| 2009/0067501 A1* | 3/2009 | Boon | H04N 19/117 375/240.16 |
| 2010/0027655 A1 | 2/2010 | Matsuo et al. | |

FOREIGN PATENT DOCUMENTS

| | | |
|---|---|---|
| CN | 101385356 A | 3/2009 |
| JP | 2003-348595 A | 12/2003 |
| JP | 2008-134889 A | 5/2008 |
| JP | 2008-271371 A | 11/2008 |
| JP | 2009-534005 | 7/2009 |
| JP | 2009-284275 A | 12/2009 |
| JP | 2012-286745 | 12/2012 |
| JP | 2012-286746 | 12/2012 |
| JP | 5488684 B2 | 5/2014 |
| JP | 5488685 B2 | 5/2014 |
| WO | WO 2005/107267 A1 | 11/2005 |
| WO | WO 2007/093629 A1 | 8/2007 |
| WO | WO 2008/012918 A1 | 1/2008 |
| WO | WO 2008/085109 A1 | 7/2008 |
| WO | WO 2008/102805 A1 | 8/2008 |
| WO | WO 2009/090884 A1 | 7/2009 |

OTHER PUBLICATIONS

Zhou et al.: "An Interpolation Method by Prediction the Direction of Pixel Texture Changing Trend for H.264/AVC Intra Prediction", Second International Symposium on Intelligent information Technology Application IITA, col. 1, IEEE, pp. 884-888 (Year: 2008).*
Drugeon et al.: "High Precision Edge Prediction for Intra Coding", ICIP, 15th IEEE International Conference on Image Processing ICIP, pp. 1620-1623 (Year: 2008).*
Tsukuba et al.; "Adaptive Multidirectional Intra Prediction", ITU, Telecommunications Standardization Sector, Study Group 16, Question 6, 33$^{rd}$ Meeting: VCEG-AG05, Video Coding Experts Group (VCEG), pp. 1-6, (2007).
Drugeon et al.; "High Precision Edge Prediction for Intra Coding", ICIP, 15$^{th}$ IEEE International Conference on Image Processing ICIP, pp. 1620-1623, (2008).

Zhou et al.; "An Interpolation Method by Predicting the Direction of Pixel Texture Changing Trend for H.264/AVC Intra Prediction", Second International Symposium on Intelligent Information Technology Application IITA, col. 1, IEEE, pp. 884-888, (2008).
Ostermann et al.; "Motion Compensated Prediction with 1/8-pel Displacement Vector Resolution", , ITU, Telecommunications Standardization Sector, Study Group 16, Question 6, 30rd Meeting: VCEG-AD09, Video Coding Experts Group (VCEG), pp. 1-7, (2006).
English-language translation of International Search Report from the Japanese Patent Office for International Application No. PCT/JP2010/057127, dated Jun. 8, 2010.
Aug. 30, 2013, European Extended Search Report for related EP application No. 10767113.3.
Yu et al., New Intra Prediction using Intra-Macroblock Motion Compensation, Joint Video Team (JVT) of ISO/IEC MPEG & ITU_T VCEG (ISO/IEC JTC1/SC29/WG11 and ITU-T SG16 Q.6), 3$^{rd}$ Meeting, May 6-10, 2002, Fairfax, Virginia.
Oct. 22, 2013, JP communication issued for related JP application No. 2012-286745.
Oct. 22, 2013, JP communication issued for related JP application No. 2012-286746.
Aug. 7, 2014, Chinese Office Action for related CN application No. 201080017179.1.
Dec. 16, 2014, Japanese Office Action issued for related JP application No. 2014-030814.
Dec. 16, 2014, Japanese Office Action issued for related JP application No. 2014-030815.
Feb. 10, 2015, Japanese communication issued for related JP application No. 2014-030814, pp. 1-4.
Feb. 10, 2015, Japanese communication issued for related JP application No. 2014-030815, pp. 1-2.
Dec. 14, 2015, Korean Office Action issued for related KR Application No. 10-2011-7024189.
Jan. 19, 2016, Korean Office Action issued for related KR Application No. 10-2015-7003667.
Jul. 7, 2016, Japanese Office Action issued for related JP application No. 2015-096017.
Jul. 7, 2016, Japanese Office Action issued for related JP application No. 2015-096016.
Jul. 19, 2016, Korean Office Action issued for related KR application No. 10-2016-7018257.
Jul. 20, 2016, European Office Action issued for related EP application No. 10767113.3.
Park, et al., Intra prediction with subpel samples, ITU—Telecommunications Standardization Sector, Study Group 16 Question 6, Video Coding Experts Group (VCEG), Oct. 20, 2007, pp. 1-8, 33$^{rd}$ Meeting, Shenzhen, CN.
Jan. 19, 2017, KR communication issued for related KR application No. 10-2016-7036971.
Mar. 3, 2017, CN communication issued for related CN application No. 201410566976.5.
Sep. 6, 2017, CN communication issued for related CN application No. 201410567414.2.
Aug. 1, 2017, CN communication issued for related CN application No. 201410569464.4.
Aug. 2, 2017, EP communication issued for related EP application No. 17160654.4.
Aug. 2, 2017, EP communication issued for related EP application No. 17160655.1.
Takeshi Tsukuba (Sharp Corporation), Adaptive Multidirectional Intra Prediction, Oct. 20, 2007, VCEG 33$^{rd}$ meeting, pp. 1-24, Shenzhen, CN.

* cited by examiner

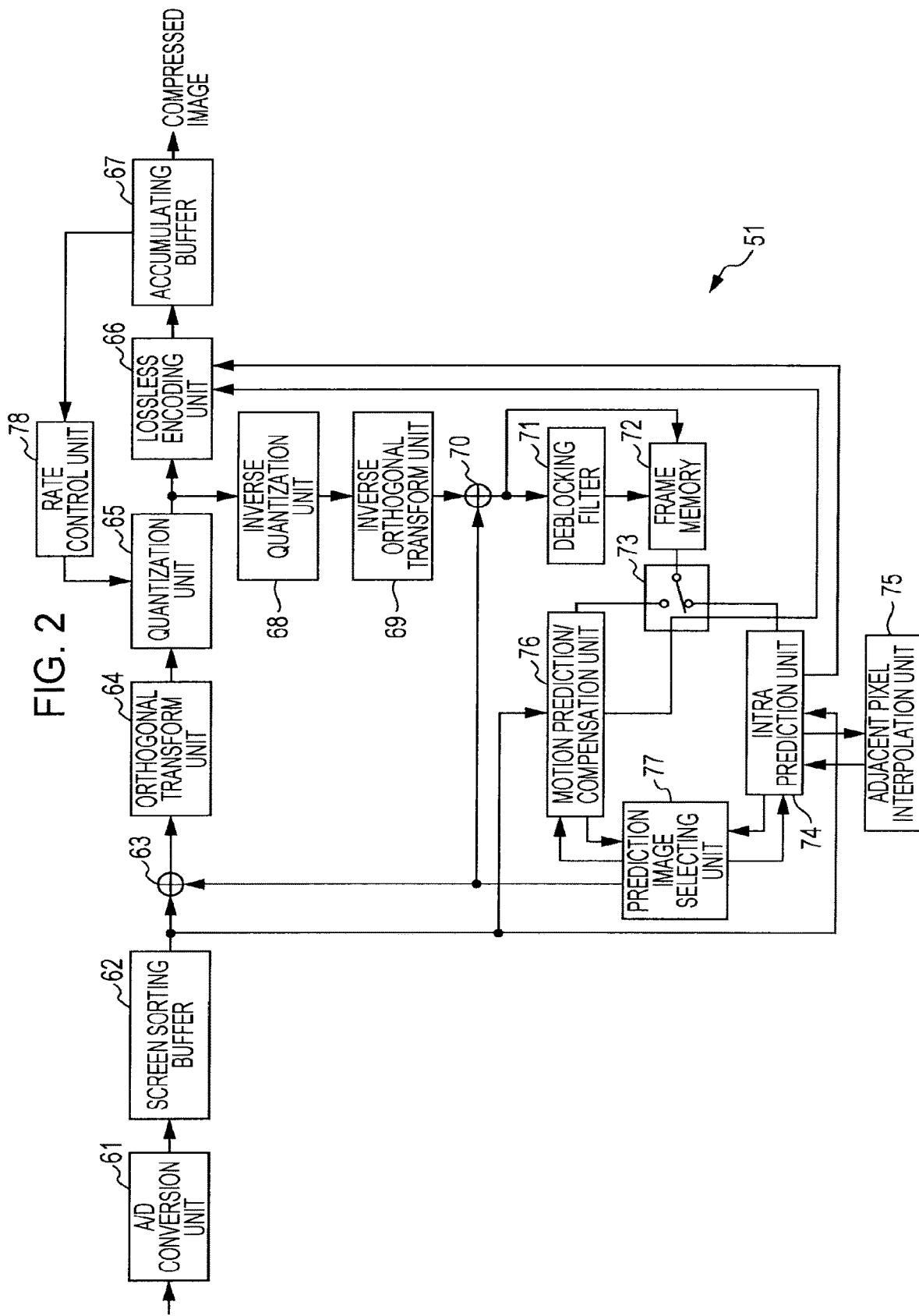

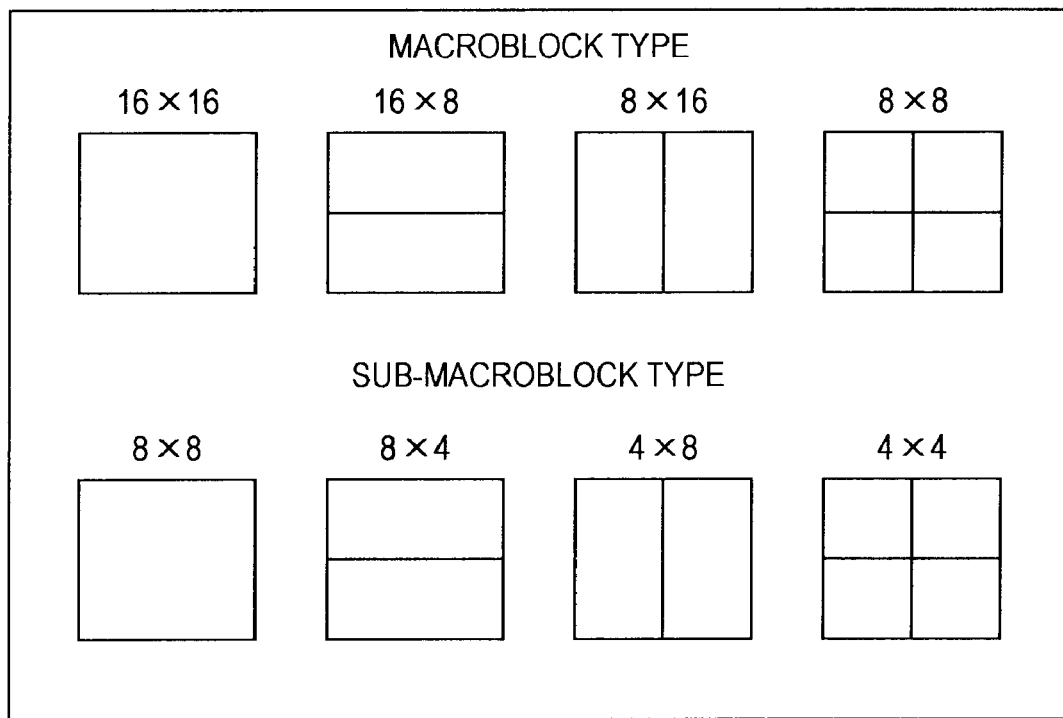

FIG. 10

| Intra4x4PredMode[4x4LumaBlkIdx] | Name of Intra4x4PredMode[4x4LumaBlkIdx] |
|---|---|
| 0 | Intra_4x4_Vertical(prediction mode) |
| 1 | Intra_4x4_Horizontal(prediction mode) |
| 2 | Intra_4x4_DC(prediction mode) |
| 3 | Intra_4x4_Diagonal_Down_Left(prediction mode) |
| 4 | Intra_4x4_Diagonal_Down_Right(prediction mode) |
| 5 | Intra_4x4_Vertical_Right(prediction mode) |
| 6 | Intra_4x4_Horizontal_Down(prediction mode) |
| 7 | Intra_4x4_Vertical_Left(prediction mode) |
| 8 | Intra_4x4_Horizontal_Up(prediction mode) |

M  A  B  C  D  E  F  G  H

I  a  b  c  d

J  e  f  g  h

K  i  j  k  l

L  m  n  o  p

| Intra_16×16_pred_mode | Name of Intra_16×16_pred_mode |
|---|---|
| 0 | Intra_16×16_Vertical(prediction_mode) |
| 1 | Intra_16×16_Horizontal(prediction_mode) |
| 2 | Intra_16×16_DC(prediction_mode) |
| 3 | Intra_16×16_Plane(prediction_mode) |

| Intra_chroma_pred_mode | Name of Intra_chroma_pred_mode |
|---|---|
| 0 | Intra_chroma_DC(prediction mode) |
| 1 | Intra_chroma_Horizontal(prediction mode) |
| 2 | Intra_chroma_Vertical(prediction mode) |
| 3 | Intra_chroma_Plane(prediction mode) |

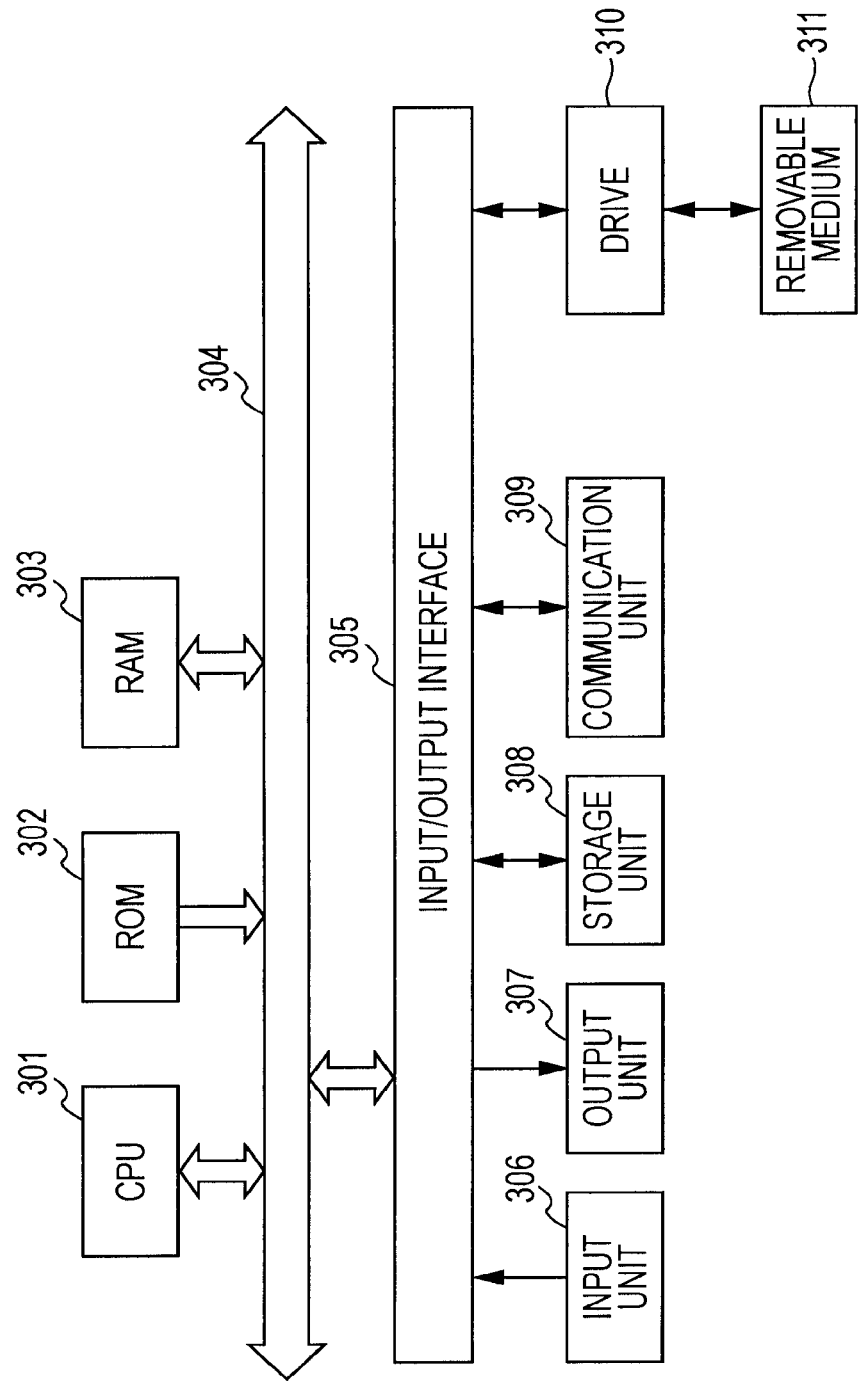

IMAGE PROCESSING DEVICE AND METHOD

CROSS REFERENCE TO PRIOR APPLICATION

This application is a continuation of U.S. patent application Ser. No. 13/264,320 (filed on Oct. 13, 2011), which is a National Stage Patent Application of PCT International Patent Application No. PCT/JP2010/057127 (filed on Apr. 22, 2010) under 35 U.S.C. § 371, which claims priority to Japanese Patent Application No. 2009-105937 (filed on Apr. 24, 2009), which are all hereby incorporated by reference in their entirety.

TECHNICAL FIELD

The present invention relates to an image processing device and method, and specifically relates to an image processing device and method which enable increase in compressed information to be suppressed and also enable prediction precision to be improved.

BACKGROUND ART

In recent years, devices have come into widespread use which subject an image to compression encoding by employing an encoding system handling image information as digital signals, and at this time compress the image by orthogonal transform such as discrete cosine transform or the like and motion compensation, taking advantage of redundancy which is a feature of the image information, in order to perform highly efficient transmission and accumulation of information. Examples of this encoding method include MPEG (Moving Picture Expert Group) and so forth.

In particular, MPEG2(ISO/IEC 13818-2) is defined as a general-purpose image encoding system, and is a standard encompassing both of interlaced scanning images and sequential-scanning images, and standard resolution images and high definition images. For example, MPEG2 has widely been employed now by broad range of applications for professional usage and for consumer usage. By employing the MPEG2 compression system, a code amount (bit rate) of 4 through 8 Mbps is allocated in the event of an interlaced scanning image of standard resolution having 720×480 pixels, for example. By employing the MPEG2 compression system, a code amount (bit rate) of 18 through 22 Mbps is allocated in the event of an interlaced scanning image of high resolution having 1920×1088 pixels, for example. Thus, a high compression rate and excellent image quality can be realized.

MPEG2 has principally been aimed at high image quality encoding adapted to broadcasting usage, but does not handle lower code amount (bit rate) than the code amount of MPEG1, i.e., an encoding system having a higher compression rate. It is expected that demand for such an encoding system will increase from now on due to the spread of personal digital assistants, and in response to this, standardization of the MPEG4 encoding system has been performed. With regard to an image encoding system, the specification thereof was confirmed as international standard as ISO/IEC 14496-2 in December in 1998.

Further, in recent years, standardization of a standard called H.26L (ITU-T Q6/16 VCEG) has progressed with image encoding for television conference usage as the object. With H.26L, it has been known that though greater computation amount is requested for encoding and decoding thereof as compared to a conventional encoding system such as MPEG2 or MPEG4, higher encoding efficiency is realized. Also, currently, as part of activity of MPEG4, standardization for taking advantage of a function that is not supported by H.26L with this H.26L taken as base to realize higher encoding efficiency has been performed as Joint Model of Enhanced-Compression Video Coding. As a schedule of standardization, H.264 and MPEG-4 Part10 (Advanced Video Coding, hereafter referred to as H.264/AVC) become an international standard in March, 2003.

Further, as an extension thereof, standardization of FRExt (Fidelity Range Extension) including a coding tool necessary for business use such as RGB, 4:2:2, or 4:4:4, 8×8DCT and quantization matrix stipulated by MPEG-2 has been completed in February, 2005. Thus, H.264/AVC has become a coding system capable of suitably expressing even film noise included in movies, and has been employed for wide ranging applications such as Blue-Ray Disc (registered trademark) and so forth.

However, nowadays, needs for further high-compression encoding have been increased, such as intending to compress an image having around 4000×2000 pixels, which is quadruple of a high-vision image. Alternatively, needs for further high-compression encoding have been increased, such as intending to distribute a high-vision image within an environment with limited transmission capacity like the Internet. Therefore, with the above-mentioned VCEG (=Video Coding Expert Group) under the control of ITU-T, studies relating to improvement of encoding efficiency have continuously been performed.

For example, with the MPEG2 system, motion prediction and compensation processing with ½ pixel precision has been performed by linear interpolation processing. On the other hand, with the H.264/AVC system, prediction and compensation processing with ¼ pixel precision using a 6-tap FIR (Finite Impulse Response Filter) filter has been performed.

As to this prediction and compensation processing with ¼ pixel precision, in recent years, studies for further improving efficiency of the H.264/AVC system have been performed. As one of coding systems for this, with NPL 1, motion prediction with ⅛ pixel precision has been proposed.

Specifically, with NPL 1, interpolation processing with ½ pixel precision is performed by a filter [−3, 12, −39, 158, 158, −39, 12, −3]/256. Also, interpolation processing with ¼ pixel precision is performed by a filter [−3, 12, −37, 229, 71, −21, 6, −1]/256, and interpolation processing with ⅛ pixel precision is performed by linear interpolation.

In this way, motion prediction using interpolation processing with higher pixel precision is performed, whereby prediction precision can be improved, and improvement in encoding efficiency can be realized particularly with a relatively slow motion sequence having high texture in resolution.

Incidentally, as one factor for the H.264/AVC system realizing high encoding efficiency as compared to the MPEG2 system according to the related art and so forth, adoption of a next-described intra prediction system has been proposed.

With the H.264/AVC system, there have been defined intra prediction modes for luminance signals of nine kinds of prediction modes in block units of 4×4 pixels and 8×8 pixels, and four kinds of prediction modes in macro block units of 16×16 pixels. With regard to color difference signals, there have been defined intra prediction modes of four kinds of prediction modes in block units of 8×8 pixels. The intra prediction modes for color difference signals may be set independently from the intra prediction modes for luminance signals. Note that the kinds of the prediction modes correspond to directions indicated with numbers 0, 1, 3 through 8 in FIG. 1. The prediction mode 2 is average value prediction.

Such an intra prediction system has been employed, thereby realizing improvement in prediction precision. However, with the H.264/AVC system, as illustrated in the directions in FIG. 1, intra prediction in increments of 22.5 degrees alone is performed. Accordingly, in the event that the inclination of an edge has an angle other than that, improvement in encoding efficiency is restricted.

Therefore, with NPL 2, proposal has been made for further improvement in encoding efficiency wherein prediction is performed with a finer angle than 22.5 degrees.

CITATION LIST

Non Patent Literature

NPL 1: "Motion compensated prediction with ⅛-pel displacement vector resolution", VCEG-AD09, ITU-Telecommunications Standardization Sector STUDY GROUP Question 6 Video coding Experts Group (VCEG), 23-27 Oct. 2006

NPL 2: Virginie Drugeon, Thomas Wedi, and Torsten Palfner, "High Precision Edge Prediction for Intra Coding", 2008

SUMMARY OF INVENTION

Technical Problem

However, with the intra prediction of the H.264/AVC system, a predetermined adjacent pixel of the block to be encoded is used for prediction, but on the other hand, with the proposal described in NPL 2, a pixel other than an adjacent pixel of the block to be encoded have also to be used.

Accordingly, with the proposal described in NPL 2, even when performing prediction with a finer angle than in increments of 22.5 degrees, the number of times of memory access, and processing increase.

The present invention has been made in light of such a situation, which further improves encoding efficiency in intra prediction while suppressing increase in the number of times of memory access and processing.

Solution to Problem

An image processing device according to a first aspect of the present invention includes: mode determining means configured to determine a prediction mode for intra prediction regarding the intra prediction block to be subjected intra prediction as to image data; phase shift means configured to shift the phase of an adjacent pixel adjacent to the intra prediction block with a predetermined positional relation in accordance with a shift direction according to the prediction mode determined by the mode determining means, and a shift amount serving as a candidate; shift amount determining means configured to determine the optimal shift amount of the phase as to the adjacent pixel using the adjacent pixel and the adjacent pixel of which the phase is shifted by the phase shift means: and prediction image generating means configured to generate a prediction image of the intra prediction block using the adjacent pixel of which the phase is shifted in accordance with the optimal shift amount determined by the shift amount determining means.

The image processing device may further include: encoding means configured to encode difference information between the image of the intra prediction block, and the prediction image generated by the prediction image generating means to generate an encoded stream; and transmission means configured to transmit shift amount information indicating the optimal shift amount determined by the shift amount determining means, and prediction mode information indicating the prediction mode determined by the mode determining means along with an encoded stream generated by the encoding means.

The encoding means may encode difference information indicating difference between the optimal shift amount determined regarding the intra prediction block, and optimal shift amount determined regarding a block which provides MostProbableMode as the shift amount information, and the transmission means may transmit an encoded stream generated by the encoding means, and the difference information.

The phase shift means may inhibit shift of the phase in the event that the prediction mode determined by the mode determining means is a DC prediction mode.

The phase shift means may shift the phase in the horizontal direction as to an upper adjacent pixel of the adjacent pixels in accordance with a shift amount serving as the candidate, and inhibit shift of the phase in the vertical direction as to a left adjacent pixel of the adjacent pixels in the event that the prediction mode determined by the mode determining means is a Vertical prediction mode, Diag_Down_Left prediction mode, or Vertical_Left prediction mode.

The phase shift means may shift the phase in the vertical direction as to a left adjacent pixel of the adjacent pixels in accordance with a shift amount serving as the candidate, and inhibit shift of the phase in the horizontal direction as to an upper adjacent pixel of the adjacent pixels in the event that the prediction mode determined by the mode determining means is a Horizontal prediction mode, or Horizontal_Up prediction mode.

The mode determining means may determine all of the prediction modes of the intra prediction, the phase shift means may shift the phase of the adjacent pixel in accordance with shift directions according to the all of the prediction modes determined by the mode determining means, and a shift amount serving as a candidate, and the shift amount determining means may use the adjacent pixel and the adjacent pixel of which phase is shifted by the phase shift means to determine the optimal shift amount of the phase, and the optimal prediction mode as to the adjacent pixel.

The image processing device may further include motion prediction compensation means configured to perform inter motion prediction regarding the inter motion prediction block of the image, and the phase shift means may use a filter used at the time of fractional pixel precision prediction by the motion prediction compensation means to shift the phase of the adjacent pixel.

An image processing method according to the first aspect of the present invention may include the step of: causing an image processing device to determine the prediction mode of intra prediction regarding an intra prediction block to be processed for intra prediction as to image data; to shift the phase of an adjacent pixel adjacent to the intra prediction block with a predetermined positional relation in accordance with a shift direction according to the determined prediction mode, and a shift amount serving as a candidate; to determine the optimal shift amount of the phase as to the adjacent pixel using the adjacent pixel and the adjacent pixel of which the phase is shifted; and to generate a prediction image of the intra prediction block using the adjacent pixel of which the phase is shifted in accordance with the determined optimal shift amount.

An image processing device according to a second aspect of the present invention includes: reception means configured to receive prediction mode information indicating the prediction mode of intra prediction regarding an intra prediction block to be processed for intra prediction, and shift amount information indicating a shift amount for shifting the phase of an adjacent pixel adjacent to the intra prediction block with a predetermined positional relation according to the prediction mode indicated by the prediction mode information; phase shift means configured to shift the phase of the adjacent pixel in accordance with a shift direction and a shift amount according to the prediction mode received by the reception means; and prediction image generating means configured to generate a prediction image of the intra prediction block using the adjacent pixel of which the shift is shifted by the phase shift means.

The reception means may receive difference information indicating difference between a shift amount regarding the intra prediction block, and a shift amount regarding a block which provides MostProbableMode as the shift amount information.

The image processing device may further include decoding mans configured to decode the intra prediction block using a prediction image generated by the prediction image generating means.

The decoding means may decode the prediction mode information received by the reception means, and the shift amount information.

The phase shift means may inhibit shift of the phase of the adjacent pixel in the event that the prediction mode decoded by the decoding means is a DC prediction mode.

The phase shift means shift may the phase in the horizontal direction as to an upper adjacent pixel of the adjacent pixels in accordance with the shift amount decoded by the decoding means, and inhibit shift of the phase in the vertical direction as to a left adjacent pixel of the adjacent pixels in the event that the prediction mode decoded by the decoding means is a Vertical prediction mode, Diag_Down_Left prediction mode, or Vertical_Left prediction mode.

The phase shift means may shift the phase in the vertical direction as to a left adjacent pixel of the adjacent pixels in accordance with the shift amount decoded by the decoding means, and inhibit shift of the phase in the horizontal direction as to an upper adjacent pixel of the adjacent pixels in the event that the prediction mode decoded by the decoding means is a Horizontal prediction mode, or Horizontal_Up prediction mode.

The image processing device may further include motion prediction compensation means configured to perform inter motion prediction using a motion vector to be decoded by the decoding means along with an encoded inter motion prediction block, and the phase shift means may shift the phase of the adjacent pixel using a filter to be used at the time of fractional pixel precision prediction by the motion prediction compensation means.

An image processing method according to the second aspect of the present invention includes the step of: causing an image processing device to receive prediction mode information indicating the prediction mode of intra prediction regarding an intra prediction block to be processed for intra prediction, and shift amount information indicating a shift amount for shifting the phase of an adjacent pixel adjacent to the intra prediction block with a predetermined positional relation according to the prediction mode indicated by the prediction mode information; to shift the phase of the adjacent pixel in accordance with a shift direction and a shift amount according to the received prediction mode; and to generate a prediction image of the intra prediction block using the adjacent pixel of which the phase is shifted.

With the first aspect of the present invention, the prediction mode of intra prediction is determined regarding an intra prediction block to be processed for intra prediction as to image data, and the phase of an adjacent pixel adjacent to the intra prediction block with a predetermined positional relation in accordance with a shift direction is shifted according to the determined prediction mode, and a shift amount serving as a candidate. Subsequently, the optimal shift amount of the phase is determined as to the adjacent pixel using the adjacent pixel and the adjacent pixel of which the phase is shifted, and a prediction image of the intra prediction block is generated using the adjacent pixel of which the phase is shifted in accordance with the determined optimal shift amount.

With the second aspect of the present invention, prediction mode information indicating the prediction mode of intra prediction regarding an intra prediction block to be processed for intra prediction, and shift amount information indicating a shift amount for shifting the phase of an adjacent pixel adjacent to the intra prediction block with a predetermined positional relation according to the prediction mode indicated by the prediction mode information are received, and the phase of the adjacent pixel is shifted in accordance with a shift direction and a shift amount according to the received prediction mode. Subsequently, a prediction image of the intra prediction block is generated using the adjacent pixel of which the phase is shifted.

Note that the above-mentioned image processing devices may be stand-alone devices, or may be internal blocks making up a single image encoding device or image decoding device.

Advantageous Effects of Invention

According to the first aspect of the present invention, a prediction image may be generated by intra prediction. Also, according to the first aspect of the present invention, encoding efficiency may be improved without increasing the number of times of memory access and processing.

According to the second aspect of the present invention, a prediction image may be generated by intra prediction. Also, according to the second aspect of the present invention, encoding efficiency may be improved without increasing the number of times of memory access and processing.

BRIEF DESCRIPTION OF DRAWINGS

FIG. 2 is a block diagram illustrating a configuration of an embodiment of an image encoding device to which the present invention has been applied.

FIG. 3 is a diagram for describing motion prediction and compensation processing with ¼ pixel precision.

FIG. 4 is a diagram for describing a motion prediction and compensation method of multi-reference frames.

FIG. 10 is a diagram illustrating the kinds of intra prediction mode of 4×4 pixels for luminance signals.

FIG. 30 is a block diagram illustrating a configuration example of the hardware of a computer.

DESCRIPTION OF EMBODIMENTS

Figure 1:
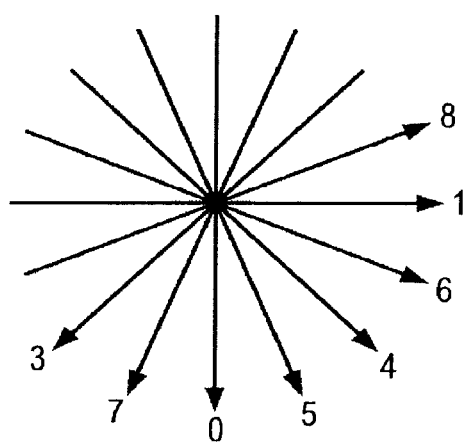
FIG. 1 is a diagram for describing the direction of intra prediction of 4×4 pixels.

Hereafter, an embodiment of the present invention will be described with reference to the drawings.

[Configuration Example of Image Encoding Device]

FIG. 2 represents the configuration of an embodiment of an image encoding device serving as an image processing device to which the present invention has been applied.

This image encoding device 51 subjects an image to compression encoding using, for example, the H.264 and MPEG-4 Part10 (Advanced Video Coding) (hereafter, described as 264/AVC) system.

With the example in FIG. 2, the image encoding device 51 is configured of an A/D conversion unit 61, a screen sorting buffer 62, a computing unit 63, an orthogonal transform unit 64, a quantization unit 65, a lossless encoding unit 66, an accumulating buffer 67, an inverse quantization unit 68, an inverse orthogonal transform unit 69, a computing unit 70, a deblocking filter 71, frame memory 72, a switch 73, an intra prediction unit 74, an adjacent pixel interpolation unit 75, a motion prediction/compensation unit 76, a prediction image selecting unit 77, and a rate control unit 78.

The A/D conversion unit 61 converts an input image from analog to digital, and outputs to the screen sorting buffer 62 for storing. The screen sorting buffer 62 sorts the images of frames in the stored order for display into the order of frames for encoding according to GOP (Group of Picture).

The computing unit 63 subtracts from the image read out from the screen sorting buffer 62 the prediction image from the intra prediction unit 74 selected by the prediction image selecting unit 77 or the prediction image from the motion prediction/compensation unit 76, and outputs difference information thereof to the orthogonal transform unit 64. The orthogonal transform unit 64 subjects the difference information from the computing unit 63 to orthogonal transform, such as discrete cosine transform, Karhunen-Loéve transform, or the like, and outputs a transform coefficient thereof. The quantization unit 65 quantizes the transform coefficient that the orthogonal transform unit 64 outputs.

The quantized transform coefficient that is the output of the quantization unit 65 is input to the lossless encoding unit 66, and subjected to lossless encoding, such as variable length coding, arithmetic coding, or the like, and compressed.

The lossless encoding unit 66 obtains information indicating intra prediction, and so forth from the intra prediction unit 74, and obtains information indicating an intra inter prediction mode, and so forth from the motion prediction/compensation unit 76. Note that, hereafter, the information indicating intra prediction will also be referred to as intra prediction mode information. Also, information indicating an information mode indicating inter prediction will also be referred to as inter prediction mode information.

The lossless encoding unit 66 encodes the quantized transform coefficient, and also encodes the information indicating intra prediction, the information indicating an inter prediction mod, and so forth, and takes these as part of header information in the compressed image. The lossless encoding unit 66 supplies the encoded data to the accumulating buffer 67 for accumulation.

For example, with the lossless encoding unit 66, lossless encoding processing, such as variable length coding, arithmetic coding, or the like, is performed. Examples of the variable length coding include CAVLC (Context-Adaptive Variable Length Coding) determined by the H.264/AVC system. Examples of the arithmetic coding include CABAC (Context-Adaptive Binary Arithmetic Coding).

The accumulating buffer 67 outputs the data supplied from the lossless encoding unit 66 to, for example, a downstream storage device or transmission path or the like not shown in the drawing, as a compressed image encoded by the H.264/AVC system.

Also, the quantized transform coefficient output from the quantization unit 65 is also input to the inverse quantization unit 68, subjected to inverse quantization, and then subjected to further inverse orthogonal transform at the inverse orthogonal transform unit 69. The output subjected to inverse orthogonal transform is added to the prediction image supplied from the prediction image selecting unit 77 by the computing unit 70, and changed into a locally decoded image. The deblocking filter 71 removes block distortion from the decoded image, and then supplies to the frame memory 72 for accumulation. An image before the deblocking filter processing is performed by the deblocking filter 71 is also supplied to the frame memory 72 for accumulation.

The switch 73 outputs the reference images accumulated in the frame memory 72 to the motion prediction/compensation unit 76 or intra prediction unit 74.

With this image encoding device 51, the I picture, B picture, and P picture from the screen sorting buffer 62 are supplied to the intra prediction unit 74 as an image to be subjected to intra prediction (also referred to as intra processing), for example. Also, the B picture and P picture read out from the screen sorting buffer 62 are supplied to the motion prediction/compensation unit 76 as an image to be subjected to inter prediction (also referred to as inter processing).

The intra prediction unit 74 performs intra prediction processing of all of the intra prediction modes serving as candidates based on the image to be subjected to intra prediction read out from the screen sorting buffer 62, and the reference image supplied from the frame memory 72 to generate a prediction image.

The intra prediction unit 74 calculates a cost function value as to the intra prediction modes wherein a prediction image has been generated, and selects the intra prediction mode of which the calculated cost function value provides the minimum value, as the optimal intra prediction mode. The intra prediction unit 74 supplies an adjacent pixel to the current block for intra prediction, and the optimal intra prediction mode information, to the adjacent pixel interpolation unit 75.

The adjacent pixel interpolation unit 75 shifts the phase of the adjacent pixel in the shift direction according to the optimal intra prediction mode from the intra prediction unit 74 by a shift amount serving as a candidate. In reality, the adjacent pixel interpolation unit 75 applies 6-tap FIR filter to an adjacent pixel to perform linear interpolation regarding the shift direction according to the optimal intra prediction mode, thereby shifting the phase of the adjacent pixel with fractional pixel precision. Accordingly, hereafter, for convenience of description, the adjacent pixel of which the phase has been shifted by 6-tap FIR filter and linear interpolation will be referred to as an interpolated adjacent pixel or an adjacent pixel of which the phase has been shifted as appropriate, but these have the same meaning.

The adjacent pixel interpolation unit 75 supplies the adjacent pixel of which the phase has been shifted to the intra prediction unit 74.

The intra prediction unit 74 uses the pixel value of the adjacent pixel from an adjacent image buffer 81, and the pixel value of the adjacent pixel of which the phase has been shifted by the adjacent pixel interpolation unit 75 to determine the optimal shift amount of the phase as to the adjacent pixel. Also, the intra prediction unit 74 uses the pixel value of the adjacent pixel of which the phase has been shifted with the determined optimal shift amount to generate a prediction image of the current block, and supplies the generated prediction image and a cost function value calculated regarding the corresponding optimal intra prediction mode to the prediction image selecting unit 77.

In the event that the prediction image generated in the optimal intra prediction mode has been selected by the prediction image selecting unit 77, the intra prediction unit 74 supplies the information indicating the optimal intra prediction mode, and the information of the optimal shift amount to the lossless encoding unit 66. In the event that the information has been transmitted from the intra prediction unit 74, the lossless encoding unit 66 encodes this information, and takes this as part of the header information in the compressed image.

The motion prediction/compensation unit 76 performs motion prediction and compensation processing regarding all of the inter prediction modes serving as candidates. Specifically, as to the motion prediction/compensation unit 76, the image to be subjected to inter processing read out from the screen sorting buffer 62 is supplied and the reference image is supplied from the frame memory 72 via the switch 73. The motion prediction/compensation unit 76 detects the motion vectors of all of the inter prediction modes serving as candidates based on the image to be subjected to inter processing and the reference image, subjects the reference image to compensation processing based on the motion vectors, and generates a prediction image.

Also, the motion prediction/compensation unit 76 calculates a cost function value as to all of the inter prediction modes serving as candidates. The motion prediction/compensation unit 76 determines, of the calculated cost function values, a prediction mode that provides the minimum value, to be the optimal inter prediction mode.

The motion prediction/compensation unit 76 supplies the prediction image generated in the optimal inter prediction mode, and the cost function value thereof to the prediction image selecting unit 77. In the event that the prediction image generated in the optimal inter prediction mode has been selected by the prediction image selecting unit 77, the motion prediction/compensation unit 76 outputs information indicating the optimal inter prediction mode (inter prediction mode information) to the lossless encoding unit 66.

Note that, according to need, the motion vector information, flag information, reference frame information, and so forth are output to the lossless encoding unit 66. The lossless encoding unit 66 also subjects the information from the motion prediction/compensation unit 76 to lossless encoding processing such as variable length coding or arithmetic coding, and inserts into the header portion of the compressed image.

The prediction image selecting unit 77 determines the optimal prediction mode from the optimal intra prediction mode and the optimal inter prediction mode based on the cost function values output from the intra prediction unit 74 or motion prediction/compensation unit 76. The prediction image selecting unit 77 then selects the prediction image in the determined optimal prediction mode, and supplies to the computing units 63 and 70. At this time, the prediction image selecting unit 77 supplies the selection information of the prediction image to the intra prediction unit 74 or motion prediction/compensation unit 76.

The rate control unit 78 controls the rate of the quantization operation of the quantization unit 65 based on a compressed image accumulated in the accumulating buffer 67 so as not to cause overflow or underflow.

[Description of H.264/AVC System]

FIG. 3 is a diagram illustrating an example of the block size of motion prediction and compensation according to the H.264/AVC system. With the H.264/AVC system, motion prediction and compensation is performed with the block size taken as variable.

Macro blocks made up of 16×16 pixels divided into 16×16-pixel, 16×8-pixel, 8×16-pixel, and 8×8-pixel partitions are shown from the left in order on the upper tier in FIG. 3. Also, 8×8-pixel partitions divided into 8×8-pixel, 8×4-pixel, 4×8-pixel, and 4×4-pixel sub partitions are shown from the left in order on the lower tier in FIG. 3.

Specifically, with the H.264/AVC system, one macro block may be divided into one of 16×16-pixel, 16×8-pixel, 8×16-pixel, and 8×8-pixel partitions with each partition having independent motion vector information. Also, an 8×8-pixel partition may be divided into one of 8×8-pixel, 8×4-pixel, 4×8-pixel, and 4×4-pixel sub partitions with each sub partition having independent motion vector information.

FIG. 4 is a diagram for describing prediction and compensation processing with ¼ pixel precision according to the H.264/AVC system. With the H.264/AVC system, prediction and compensation processing with ¼ pixel precision using 6-tap FIR (Finite Impulse Response Filter) filter is performed.

With the example in FIG. 4, positions A indicate the positions of integer precision pixels, and positions b, c, and d indicate positions with ½ pixel precision, and positions e1, e2, and e3 indicate positions with ¼ pixel precision. First, hereafter, Clip( ) is defined like the following Expression (1).

[Mathematical Expression 1]

$$\mathrm{Clip1}(a) = \begin{cases} 0; & \text{if } (a < 0) \\ a; & \text{otherwise} \\ \max\_pix; & \text{if } (a > \max\_pix) \end{cases} \quad (1)$$

Note that, in the event that the input image has 8-bit precision, the value of max_pix becomes 255.

The pixel values in the positions b and d are generated like the following Expression (2) using a 6-tap FIR filter.

[Mathematical Expression 2]

$$F = A_{-2} - 5 \cdot A_{-1} + 20 \cdot A_0 + 20 \cdot A_1 - 5 \cdot A_2 + A_3$$

$$b, d = \mathrm{Clip1}((F+16) \gg 5) \quad (2)$$

The pixel value in the position c is generated like the following Expression (3) by applying a 6-tap FIR filter in the horizontal direction and the vertical direction.

[Mathematical Expression 3]

$$F = b_{-2} - 5 \cdot b_{-1} + 20 \cdot b_0 + 20 \cdot b_1 - 5 \cdot b_2 + b_3$$

or $$F = d_{-2} - 5 \cdot d_{-1} + 20 \cdot d_0 + 20 \cdot d_1 - 5 \cdot d_2 + d_3$$

$$c = \mathrm{Clip1}((F+512) \gg 10) \quad (3)$$

Note that Clip processing is lastly executed only once after both of sum-of-products processing in the horizontal direction and the vertical direction are performed.

Positions e1 through e3 are generated by linear interpolation as shown in the following Expression (4).

[Mathematical Expression 4]

$$e_1 = (A+b+1) \gg 1$$

$$e_2 = (b+d+1) \gg 1$$

$$e_3 = (b+c+1) \gg 1 \quad (4)$$

With the H.264/AVC system, by the motion prediction and compensation processing described above with reference to FIGS. 3 through 4 being performed, vast amounts of motion vector information are generated, and if these are encoded without change, deterioration in encoding efficiency is caused. In response to this, with the H.264/AVC system, according to a method shown in FIG. 5, reduction in motion vector coding information has been realized.

Figure 5:
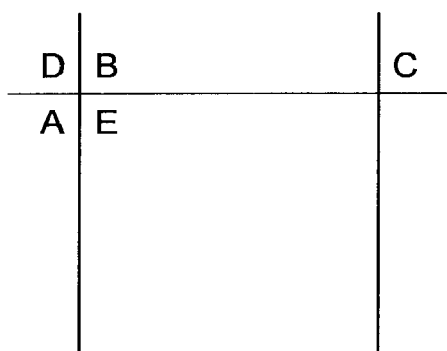
FIG. 5 is a diagram for describing an example of a motion vector information generating method.

FIG. 5 is a diagram for describing a motion vector information generating method according to the H.264/AVC system.

With the example in FIG. 5, the current block E to be encoded from now on (e.g., 16×16 pixels), and blocks A through D, which have already been encoded, adjacent to the current block E are shown.

Specifically, the block D is adjacent to the upper left of the current block E, the block B is adjacent to above the current block E, the block C is adjacent to the upper right of the current block E, and the block A is adjacent to the left of the current block E. Note that the reason why the blocks A through D are not sectioned is because each of the blocks represents a block having one structure of 16×16 pixels through 4×4 pixels described above with reference to FIG. 2.

For example, let us say that motion vector information as to X (=A, B, C, D, E) is represented with $mv_X$. First, prediction motion vector information $pmv_E$ as to the current block E is generated like the following Expression (5) by median prediction using motion vector information regarding the blocks A, B, and C.

$$pmv_E = \mathrm{med}(mv_A, mv_B, mv_C) \quad (5)$$

The motion vector information regarding the block C may not be used (may be unavailable) due to a reason such as the edge of an image frame, before encoding, or the like. In this case, the motion vector information regarding the block D is used instead of the motion vector information regarding the block C.

Data $mvd_E$ to be added to the header portion of the compressed image, serving as the motion vector information as to the current block E, is generated like the following Expression (6) using $pmv_E$.

$$mvd_E = mv_E - pmv_E \quad (6)$$

Note that, in reality, processing is independently performed as to the components in the horizontal direction and vertical direction of the motion vector information.

In this way, prediction motion vector information is generated, the data $mvd_E$ that is difference between the prediction motion vector information generated based on correlation with an adjacent block, and the motion vector information is added to the header portion of the compressed image as motion vector information, whereby the motion vector information can be reduced.

Here, the prediction and compensation processing with ¼ pixel precision in the H.264/AVC system described above with reference to FIG. 4 is executed at the motion prediction/compensation unit, but with the image encoding device 51 in FIG. 2, prediction with ¼ pixel precision is also performed in intra prediction. This intra prediction with fractional pixel precision is executed by the intra prediction unit 74 and adjacent pixel interpolation unit 75, which will be described next.

[Configuration Example of Intra Prediction Unit and Adjacent Pixel Interpolation Unit]

Figure 6:
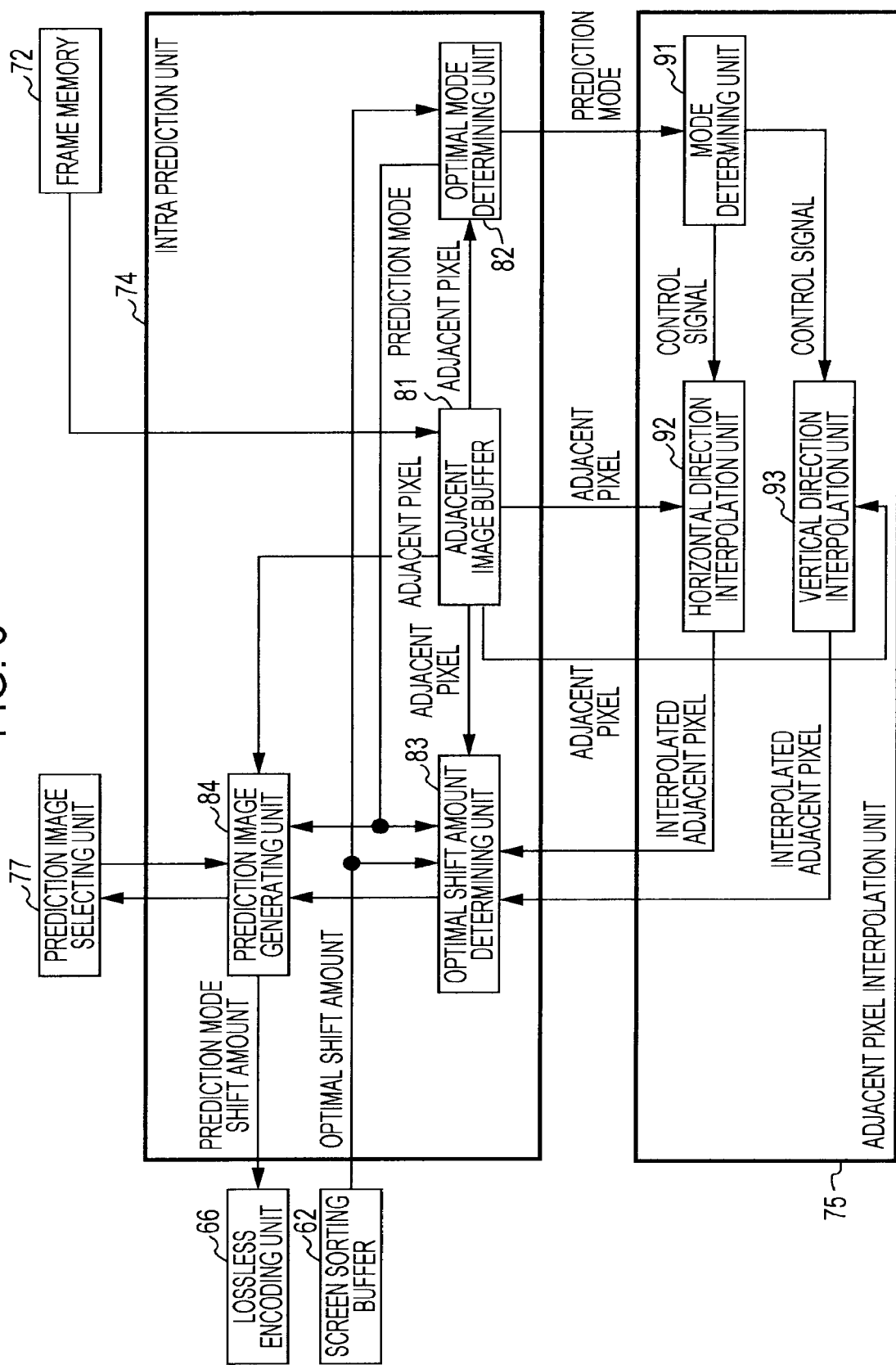
FIG. 6 is a block diagram illustrating a configuration example of an intra prediction unit and an adjacent pixel interpolation unit.

FIG. 6 is a block diagram illustrating a detailed configuration example of the intra prediction unit and adjacent pixel interpolation unit.

In the case of the example in FIG. 6, the intra prediction unit 74 is configured of an adjacent image buffer 81, an optimal mode determining unit 82, an optimal shift amount determining unit 83, and a prediction image generating unit 84.

The adjacent pixel interpolation unit 75 is configured of a mode determining unit 91, a horizontal direction interpolation unit 92, and a vertical direction interpolation unit 93.

The adjacent image buffer 81 accumulates an adjacent pixel of the block to be subjected to intra prediction from the frame memory 72. In the case of FIG. 6, drawing of the switch 73 is omitted, but the adjacent pixel is supplied form the frame memory 72 to the adjacent image buffer 81 via the switch 73.

An image to be subjected to intra prediction read out from the screen sorting buffer 62 is input to the optimal mode determining unit 82. The optimal mode determining unit 82 reads out an adjacent pixel corresponding to the block to be subjected to intra prediction from the adjacent image buffer 81.

The optimal mode determining unit 82 performs intra prediction processing of all of the intra prediction modes serving as candidates using the adjacent pixel corresponding to the image of the block to be subjected to intra prediction to generate a prediction image. The optimal mode determining unit 82 calculates cost function values as to the intra prediction modes of which the prediction images have been generated, and determines the intra prediction mode of which the calculated cost function value provides the minimum value to be the optimal intra prediction mode. The information of the determined prediction mode is supplied to the mode determining unit 91, optimal shift amount determining unit 83, and prediction image generating unit 84. Also, the cost function value corresponding to the supplied prediction mode is also supplied to the prediction image generating unit 84.

The image to be subjected to intra prediction read out from the screen sorting buffer 62, and the information of the prediction mode determined to be the optimal by the optimal mode determining unit 82 axe input to the optimal shift amount determining unit 83. Also, the adjacent pixel, which has been subjected to linear interpolation by the horizontal direction interpolation unit 92 and vertical direction interpolation unit 93, and the phase of which has been shifted according to the optimal intra prediction mode is input to the optimal shift amount determining unit 83. The optimal shift amount determining unit 83 reads out the adjacent pixel corresponding to the block to be subjected to intra prediction from the adjacent image buffer 81.

The optimal shift amount determining unit 83 uses the image of the block to be subjected to intra prediction, the corresponding adjacent pixel, and the pixel value of the corresponding interpolated adjacent pixel regarding the prediction mode determined by the optimal mode determining unit 82 to determine the optimal shift amount. The optimal shift amount determining unit 83 calculates, for example, prediction error (residual error) or the like, and determines a shift amount having the calculated least prediction error to be the optimal shift amount. The information of the optimal shift amount determined by the optimal shift amount determining unit 83 is supplied to the prediction image generating unit 84.

The cost function value corresponding to the prediction mode information determined by the optimal mode determining unit 82, and the optimal shift amount information determined by the optimal shift amount determining unit 83 are input to the prediction image generating unit 84. The prediction image generating unit 84 reads out the adjacent pixel corresponding to the block to be subjected to intra prediction from the adjacent image buffer 81, and shifts the phase of the read adjacent pixel in the phase direction according to the prediction mode with the optimal shift amount.

The prediction image generating unit 84 performs intra prediction in the optimal intra prediction mode determined by the optimal mode determining unit 82 using the adjacent pixel of which the phase has been shifted to generate a prediction image of the block to be processed. The prediction image generating unit 84 outputs the generated prediction image and the corresponding cost function value to the prediction image selecting unit 77.

Also, in the event that the prediction image generated in the optimal intra prediction mode has been selected by the prediction image selecting unit 77, the prediction image generating unit 84 supplies the information indicating the optimal intra prediction mode, and the information of the shift amount to the lossless encoding unit 66.

The mode determining unit 91 outputs the control signal according to the prediction mode determined by the optimal mode determining unit 82 to the horizontal direction interpolation unit 92 and vertical direction interpolation unit 93. For example, a control signal indicating ON of interpolation processing is output according to the prediction mode.

The horizontal direction interpolation unit 92 and vertical direction interpolation unit 93 each read out an adjacent pixel from the adjacent image buffer 81 according to the control signal from the mode determining unit 91. The horizontal direction interpolation unit 92 and vertical direction interpolation unit 93 each shift the phase of the read adjacent pixel in the horizontal direction and vertical direction by 6-tap FIR filter and linear interpolation. The information of the adjacent pixel interpolated by the horizontal direction interpolation unit 92 and vertical direction interpolation unit 93 is supplied to the optimal shift amount determining unit 83.

[Description of Encoding Processing of Image Encoding Device]

Figure 7:
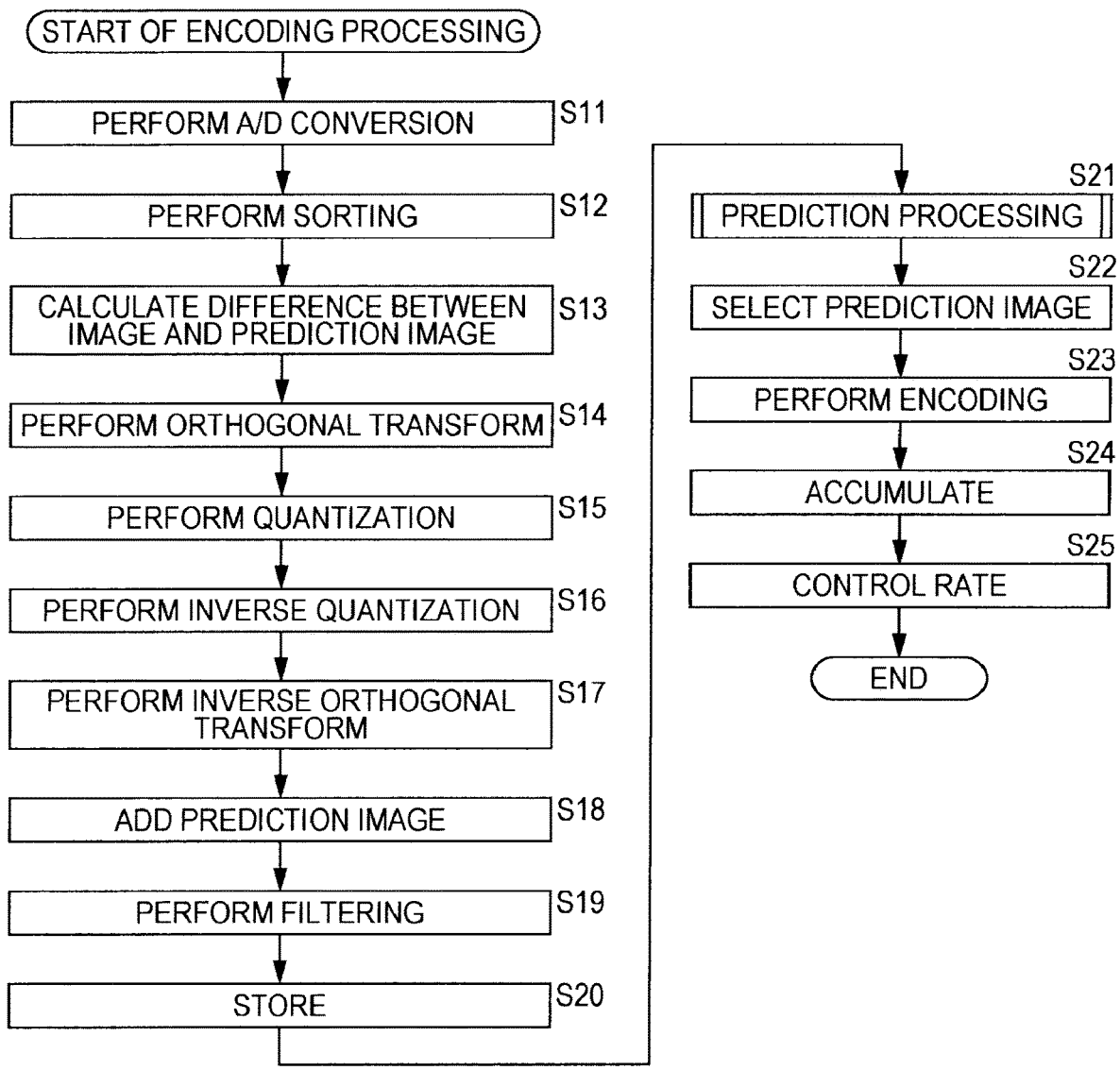
FIG. 7 is a flowchart for describing the encoding processing of the image encoding device in FIG. 2.

Next, the encoding processing of the image encoding device 51 in FIG. 2 will be described with reference to the flowchart in FIG. 7.

In step S11, the A/D conversion unit 61 converts an input image from analog to digital. In step S12, the screen sorting buffer 62 stores the image supplied from the A/D conversion unit 61, and performs sorting from the sequence for displaying the pictures to the sequence for encoding.

In step S13, the computing unit 63 computes difference between an image sorted in step S12 and the prediction image. The prediction image is supplied to the computing unit 63 from the motion prediction/compensation unit 76 in the event of performing inter prediction, and from the intra prediction unit 74 in the event of performing intra prediction, via the prediction image selecting unit 77.

The difference data is smaller in the data amount as compared to the original image data. Accordingly, the data amount can be compressed as compared to the case of encoding the original image without change.

In step S14, the orthogonal transform unit 64 subjects the difference information supplied from the computing unit 63 to orthogonal transform. Specifically, orthogonal transform, such as discrete cosine transform, Karhunen-Loéve transform, or the like, is performed, and a transform coefficient is output. In step S15, the quantization unit 65 quantizes the transform coefficient. At the time of this quantization, a rate is controlled such that later-described processing in step S25 will be described.

The difference information thus quantized is locally decoded as follows. Specifically, in step S16, the inverse quantization unit 68 subjects the transform coefficient quantized by the quantization unit 65 to inverse quantization using a property corresponding to the property of the quantization unit 65. In step S17, the inverse orthogonal transform unit 69 subjects the transform coefficient subjected to inverse quantization by the inverse quantization unit 68 to inverse orthogonal transform using a property corresponding to the property of the orthogonal transform unit 64.

In step S18, the computing unit 70 adds the prediction image input via the prediction image selecting unit 77 to the locally decoded difference information, and generates a locally decoded image (the image corresponding to the input to the computing unit 63). In step S19, the deblocking filter 71 subjects the image output from the computing unit 70 to filtering. Thus, block distortion is removed. In step S20, the frame memory 72 stores the image subjected to filtering. Note that an image not subjected to filtering processing by the deblocking filter 71 is also supplied from the computing unit 70 to the frame memory 72 for storing.

In step S21, the intra prediction unit 74 and motion prediction/compensation unit 76 each perform image prediction processing. Specifically, in step S21, the intra prediction unit 74 performs intra prediction processing in the intra prediction mode. The motion prediction/compensation unit 76 performs motion prediction and compensation processing in the inter prediction mode.

Figure 8:
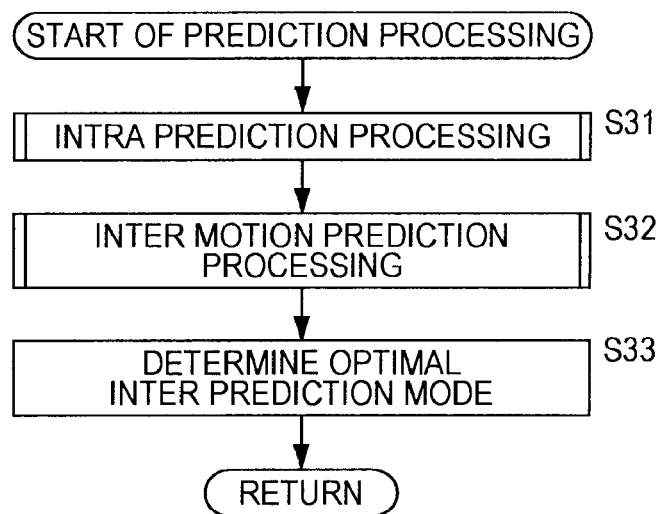
FIG. 8 is a flowchart for describing prediction processing in step S21 in FIG. 7.

The details of the prediction processing in step S21 will be described later with reference to FIG. 8, but according to this processing, the prediction processes in all of the intra prediction modes serving as candidates are performed, and the cost function values in all of the prediction modes serving as candidates are calculated. The optimal intra prediction mode is selected based on the calculated cost function values, and the prediction image generated by the intra prediction in the optimal intra prediction mode, and the cost function value thereof are supplied to the prediction image selecting unit 77.

Specifically, at this time, the intra prediction unit 74 supplies the prediction image generated by intra prediction using the adjacent pixel of which the phase has been shifted in the shift direction according to the optimal intra prediction mode by 6-tap FIR filter and linear interpolation with the optimal shift amount, to the prediction image selecting unit 77. Note that the cost function value regarding the optimal intra prediction mode is also supplied to the prediction image selecting unit 77 along with the prediction image.

On the other hand, based on the calculated cost function values, the optimal inter prediction mode is determined out of the inter prediction modes, and the prediction image generated in the optimal inter prediction mode, and the cost function value thereof are supplied to the prediction image selecting unit 77.

In step S22, the prediction image selecting unit 77 determines one of the optimal intra prediction mode and the optimal inter prediction mode to be the optimal prediction mode based on the cost function values output from the intra prediction unit 74 and the motion prediction/compensation unit 76. The prediction image selecting unit 77 then selects the prediction image in the determined optimal prediction mode, and supplies to the computing units 63 and 70. This prediction image is, as described above, used for calculations in steps S13 and S18.

Note that the selection information of this prediction image is supplied to the intra prediction unit 74 or motion prediction/compensation unit 76. In the event that the prediction image in the optimal intra prediction mode has been selected, the intra prediction unit 74 supplies information indicating the optimal intra prediction mode (i.e., intra prediction mode information) and information of the shift amount determined to be the optimal, to the lossless encoding unit 66.

In the event that the prediction image in the optimal inter prediction mode has been selected, the motion prediction/compensation unit 76 outputs information indicating the optimal inter prediction mode, and according to need, information according to the optimal inter prediction mode to the lossless encoding unit 66. Examples of the information according to the optimal inter prediction mode include motion vector information, flag information, and reference frame information. Specifically, in the event that the prediction image according to the inter prediction mode has been selected as the optimal inter prediction mode, the motion prediction/compensation unit 76 outputs the inter prediction mode information, motion vector information, and reference frame information to the lossless encoding unit 66.

In step S23, the lossless encoding unit 66 encodes the quantized transform coefficient output from the quantization unit 65. Specifically, the difference image is subjected to lossless encoding such as variable length coding, arithmetic coding, or the like, and compressed. At this time, the intra prediction mode information from the intra prediction unit 74, or the information according to the optimal inter prediction mode from the motion prediction/compensation unit 76, and so forth input to the lossless encoding unit 66 in step S22 described above are also encoded, and added to the header information.

In step S24, the accumulating buffer 67 accumulates the difference image as the compressed image. The compressed image accumulated in the accumulating buffer 67 is read out as appropriate, and transmitted to the decoding side via the transmission path.

In step S25, the rate control unit 78 controls the rate of the quantization operation of the quantization unit 65 based on the compressed image accumulated in the accumulating buffer 67 so as not to cause overflow or underflow.

[Description of Prediction Processing]

Next, the prediction processing in step S21 in FIG. 7 will be described with reference to the flowchart in FIG. 8.

In the event that the image to be processed, supplied from the screen sorting buffer 62, is an image in a block to be subjected to intra processing, the decoded image to be referenced is read out from the frame memory 72, and supplied to the intra prediction unit 74 via the switch 73.

In step S31, the intra prediction unit 74 uses the supplied image to subject pixels of the block to be processed to intra prediction in all of the intra prediction modes serving as candidates. Note that pixels not subjected to deblocking filtering by the deblocking filter 71 are used as the decoded pixels to be referenced.

Figure 20:
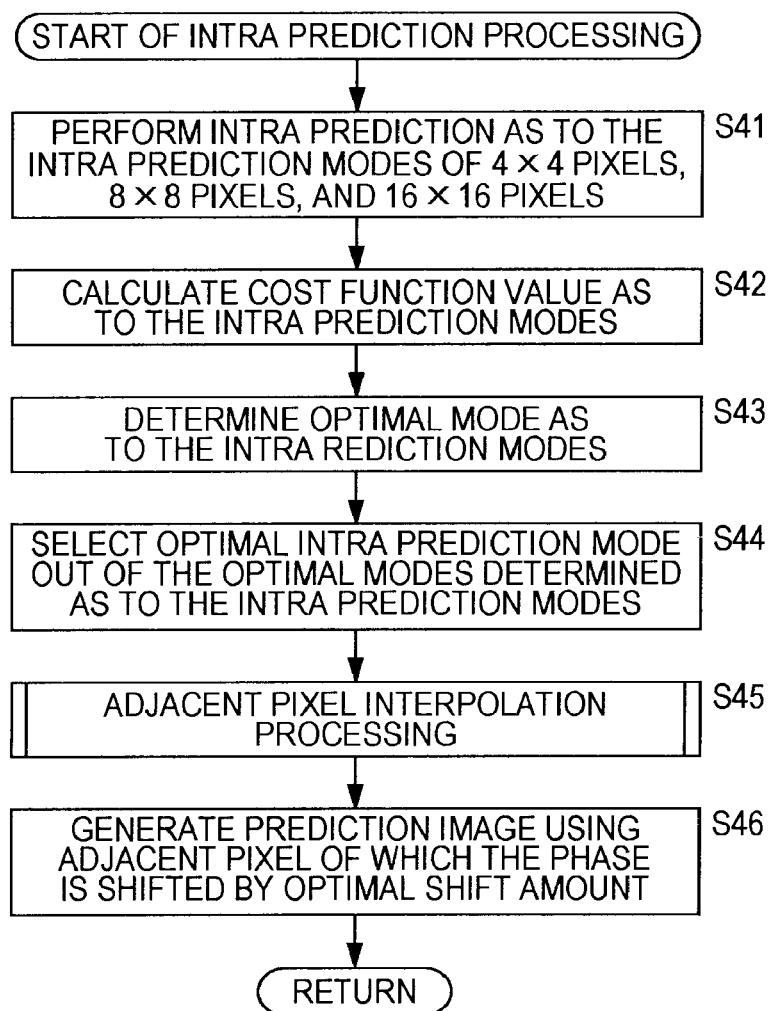
FIG. 20 is a flowchart for describing intra prediction processing in step S31 in FIG. 8.

The details of the intra prediction processing in step S31 will be described later with reference to FIG. 20, but according to this processing, intra prediction is performed using all of the intra prediction modes serving as candidates. A cost function value is calculated as to all of the intra prediction modes serving as candidates, and the optimal intra prediction mode is determined based on the calculated cost function values.

Subsequently, according to 6-tap FIR filter and linear interpolation, the phase of an adjacent pixel is shifted with the optimal shift amount in the shift direction according to the determined optimal intra prediction mode. A prediction image is generated by intra prediction in the optimal intra prediction mode using the adjacent pixel of which the phase has been shifted. The generated prediction image and the cost function value of the optimal intra prediction mode are supplied to the prediction image selecting unit 77.

In the event that the image to be processed supplied from the screen sorting buffer 62 is an image to be subjected to inter processing, the image to be referenced is read out from the frame memory 72, and supplied to the motion prediction/compensation unit 76 via the switch 73. In step S32, based on these images, the motion prediction/compensation unit 76 performs inter motion prediction processing. That is to say, the motion prediction/compensation unit 76 references the image supplied from the frame memory 72 to perform the motion prediction processing in all of the inter prediction modes serving as candidates.

Figure 22:
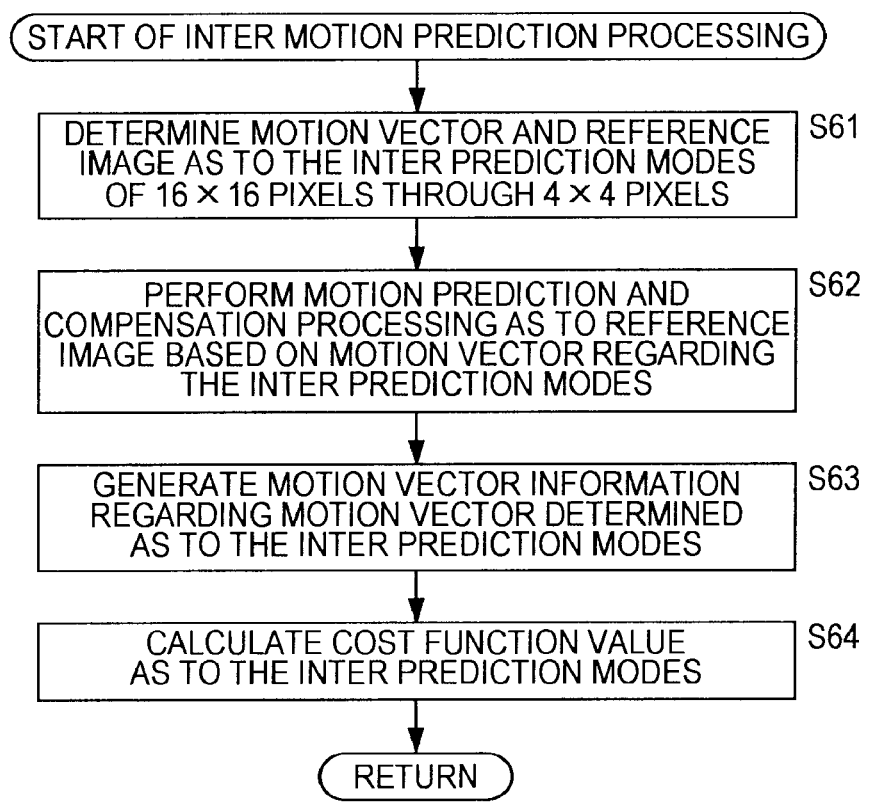
FIG. 22 is a flowchart for describing inter motion prediction processing in step S32 in FIG. 8.

The details of the inter motion prediction processing in step S32 will be described later with reference to FIG. 22, but according to this processing, the motion prediction processing in all of the inter prediction modes serving as candidates is performed, and a cost function value as to all of the inter prediction modes serving as candidates is calculated.

In step S33, the motion prediction/compensation unit 76 compares the cost function values as to the inter prediction modes calculated in step S32, and determines the prediction mode that provides the minimum value, to be the optimal inter prediction mode. The motion prediction/compensation unit 76 supplies the prediction image generated in the optimal inter prediction mode, and the cost function value thereof to the prediction image selecting unit 77.

[Description of Intra Prediction Processing According to H.264/AVC System]

Next, the intra prediction modes determined by the H.264/AVC system will be described.

First, the intra-prediction modes as to luminance signals will be described. With the intra prediction modes for luminance signals, three systems of an intra 4×4 prediction mode, an intra 8×8 prediction mode, and an intra 16×16 prediction mode are determined. These are modes for determining block units, and are set for each macro block. Also, an intra prediction mode may be set to color difference signals independently from luminance signals for each macro block.

Further, in the event of the intra 4×4 prediction mode, one prediction mode can be set out of the nine kinds of prediction modes for each 4×4-pixel current block. In the event of the intra 8×8 prediction mode, one prediction mode can be set out of the nine kinds of prediction modes for each 8×8-pixel current block. Also, in the event of the intra 16×16 prediction mode, one prediction mode can be set to a 16×16-pixel current macro block out of the four kinds of prediction modes.

Note that, hereafter, the intra 4×4 prediction mode, intra 8×8 prediction mode, and intra 16×16 prediction mode will also be referred to as 4×4-pixel intra prediction mode, 8×8-pixel intra prediction mode, and 16×16-pixel intra prediction mode as appropriate, respectively.

Figure 9:
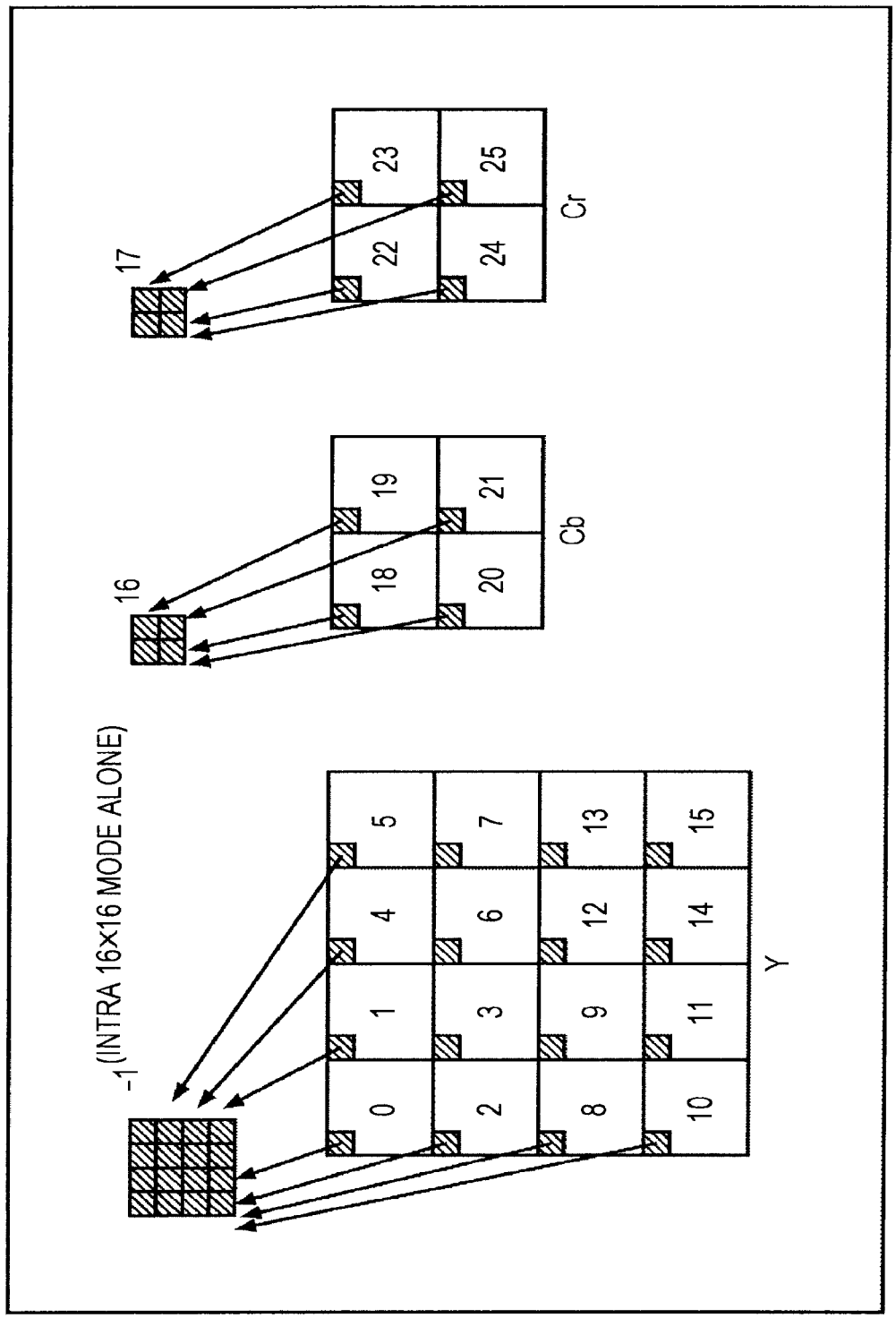
FIG. 9 is a diagram for describing processing sequence in the event of an intra prediction mode of 16×16 pixels.

With the example in FIG. 9, numerals −1 through 25 appended to the blocks represent the bit stream sequence (processing sequence on the decoding side) of the blocks thereof. Note that, with regard to luminance signals, a macro block is divided into 4×4 pixels, and DCT of 4×4 pixels is performed. Only in the event of the intra 16×16 prediction mode, as shown in a block of −1, the DC components of the blocks are collected, a 4×4 matrix is generated, and this is further subjected to orthogonal transform.

On the other hand, with regard to color difference signals, after a macro block is divided into 4×4 pixels, and DCT of 4×4 pixels is performed, as shown in the blocks 16 and 17, the DC components of the blocks are collected, a 2×2 matrix is generated, and this is further subjected to orthogonal transform.

Note that, with regard to the intra 8×8 prediction mode, this may be applied to only a case where the current macro block is subjected to 8×8 orthogonal transform with a high profile or a profile beyond this.

Figure 11:
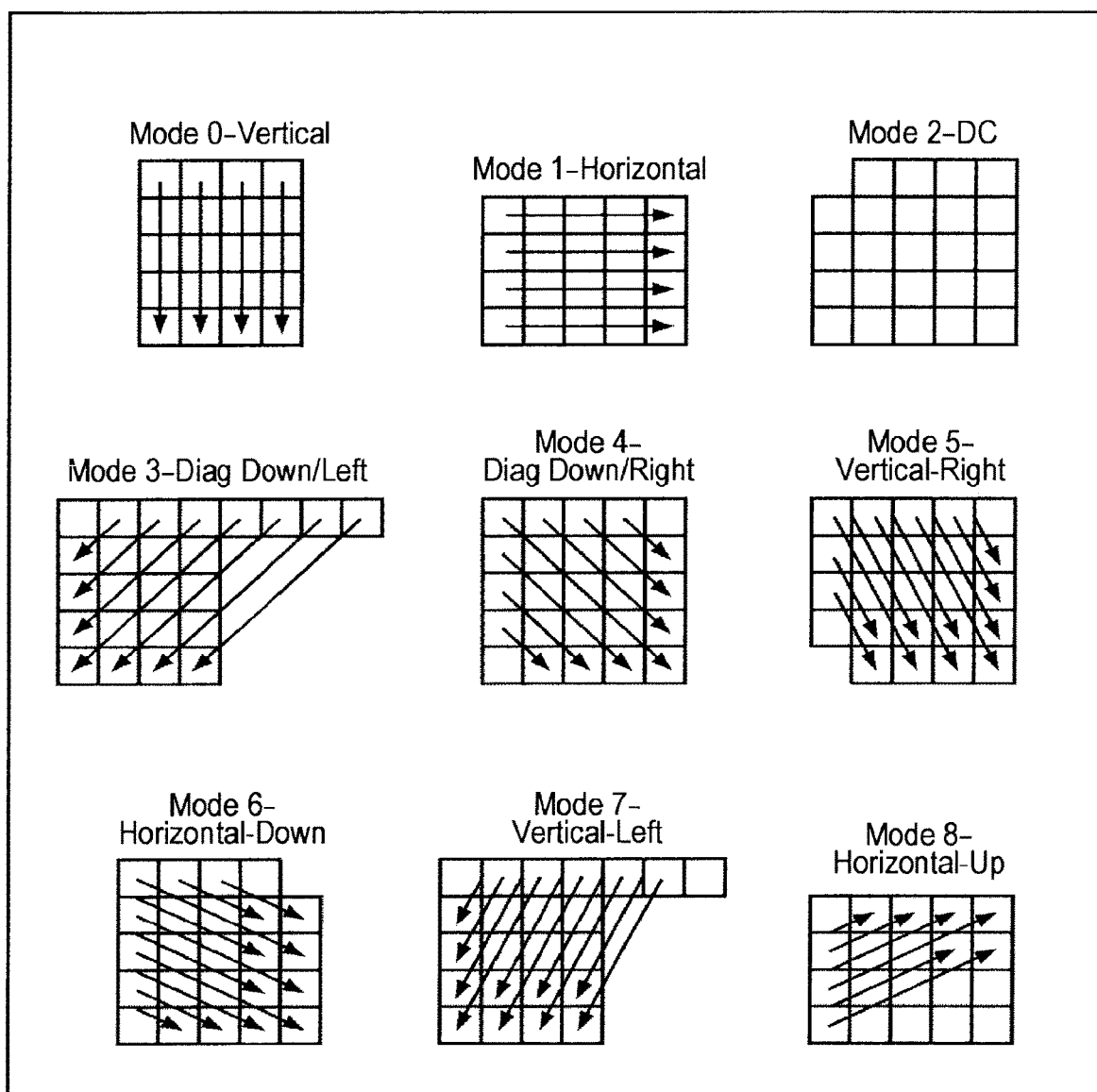
FIG. 11 is a diagram illustrating the kinds of intra prediction mode of 4×4 pixels for luminance signals.

FIG. 10 and FIG. 11 are diagrams showing nine kinds of 4×4-pixel intra-prediction modes (Intra_4×4_pred_mode) for luminance signals. The eight kinds of modes other than the mode 2 showing average value (DC) prediction correspond to directions indicated with numbers 0, 1, 3 through 8 in FIG. 8, respectively.

The nine kinds of intra_4×4_pred_mode will be described with reference to FIG. 12. With the example in FIG. 12, pixels a through p represent the pixels of the block to be subjected to intra-processing, and pixel values A through M represent the pixel values of pixels belonging to an adjacent block. Specifically, the pixels a through p are an image to be processed read out from the screen sorting buffer 62, and the pixel values A through M are the pixel values of a decoded image to be read out from the frame memory 72 and referenced.

In the event of the intra-prediction modes shown in FIG. 10 and FIG. 11, the prediction pixel values of the pixels a through p are generated as follows using the pixel values A through M of the pixels belonging to an adjacent pixel. Here, that a pixel value is "available" represents that the pixel value is available without a reason such that the pixel is positioned in the edge of the image frame, or has not been encoded yet. On the other hand, that a pixel value is "unavailable" represents that the pixel value is unavailable due to a reason such that the pixel is positioned in the edge of the image frame, or has not been encoded yet.

The mode 0 is a Vertical Prediction mode (vertical prediction mode), and is applied to only a case where the pixel values A through D are "available". In this case, the prediction pixel values of the pixels a through p are generated like the following Expression (7).

Prediction pixel values of pixels $a,e,i,$ and $m=A$

Prediction pixel values of pixels $b,f,j,$ and $n=B$

Prediction pixel values of pixels $c,g,k,$ and $o=C$

Prediction pixel values of pixels $d,h,l,$ and $p=D$ (7)

The mode 1 is a Horizontal Prediction mode (horizontal prediction mode), and is applied to only a case where the pixel values I through L are "available". In this case, the prediction pixel values of the pixels a through p are generated like the following Expression (8).

Prediction pixel values of pixels $a,b,c,$ and $d=I$

Prediction pixel values of pixels $e,f,g,$ and $h=J$

Prediction pixel values of pixels $i,j,k,$ and $l=K$

Prediction pixel values of pixels $m,n,o,$ and $p=L$ (8)

The mode 2 is a DC Prediction mode, and the prediction pixel value is generated like Expression (9) when the pixel values A, B, C, D, I, J, K, and L are all "available".

$$(A+B+C+D+I+J+K+L+4) >> 3 \qquad (9)$$

Also, when the pixel values A, B, C, and D are all "unavailable", the prediction pixel value is generated like Expression (10).

$$(I+J+K+L+2) >> 2 \qquad (10)$$

Also, when the pixel values I, J, K, and L are all "unavailable", the prediction pixel value is generated like Expression (11).

$$(A+B+C+D+2)>>2 \quad (11)$$

Note that, when the pixel values A, B, C, D, I, J, K, and L are all "unavailable", 128 is employed as the prediction pixel value.

The mode 3 is a Diagonal_Down_Left Prediction mode, and is applied to only a case where the pixel values A, B, C, D, I, J, K, L, and M are "available". In this case, the prediction pixel values of the pixels a through p are generated like the following Expression (12).

Prediction pixel value of pixel $a=(A+2B+C+2)>>2$

Prediction pixel values of pixels $b$ and $e=(B+2C+D+2)>>2$

Prediction pixel values of pixels $c,f$, and $i=(C+2D+E+2)>>2$

Prediction pixel values of pixels $d,g,j$, and $m=(D+2E+F+2)>>2$

Prediction pixel values of pixels $h,k$, and $n=(E+2F+G+2)>>2$

Prediction pixel values of pixels $l$ and $o=(F+2G+H+2)>>2$

Prediction pixel value of pixel $p=(G+3H+2)>>2$ (12)

The mode 4 is a Diagonal_Down_Right Prediction mode, and is applied to only a case where the pixel values A, B, C, D, I, J, K, L, and M are "available". In this case, the prediction pixel values of the pixels a through p are generated like the following Expression (13).

Prediction pixel value of pixel $m=(J+2K+L+2)>>2$

Prediction pixel values of pixels $i$ and $n=(I+2J+K+2)>>2$

Prediction pixel values of pixels $e,j$, and $o=(M+2I+J+2)>>2$

Prediction pixel values of pixels $a,f,k$, and $p=(A+2M+I+2)>>2$

Prediction pixel values of pixels $b,g$, and $l=(M+2A+B+2)>>2$

Prediction pixel values of pixels $c$ and $h=(A+2B+C+2)>>2$

Prediction pixel value of pixel $d=(B+2C+D+2)>>2$ (13)

The mode 5 is a Diagonal_Vertical_Right Prediction mode, and is applied to only a case where the pixel values A, B, C, D, I, J, K, L, and M are "available". In this case, the prediction pixel values of the pixels a through p are generated like the following Expression (14).

Prediction pixel values of pixels $a$ and $j=(M+A+1)>>1$

Prediction pixel values of pixels $b$ and $k=(A+B+1)>>1$

Prediction pixel values of pixels $c$ and $l=(B+C+1)>>1$

Prediction pixel value of pixel $d=(C+D+1)>>1$

Prediction pixel values of pixels $e$ and $n=(1+2M+A+2)>>2$

Prediction pixel values of pixels $f$ and $o=(M+2A+B+2)>>2$

Prediction pixel values of pixels $g$ and $p=(A+2B+C+2)>>2$

Prediction pixel value of pixel $h=(B+2C+D+2)>>2$

Prediction pixel value of pixel $i=(M+2I+J+2)>>2$

Prediction pixel value of pixel $m=(I+2J+K+2)>>2$ (14)

The mode 6 is a Horizontal_Down Prediction mode, and is applied to only a case where the pixel values A, B, C, D, I, J, K, L, and M are "available". In this case, the prediction pixel values of the pixels a through p are generated like the following Expression (15).

Prediction pixel values of pixels $a$ and $g=(M+I+1)>>1$

Prediction pixel values of pixels $b$ and $h=(I+2M+A+2)>>2$

Prediction pixel value of pixel $c=(M+2A+B+2)>>2$

Prediction pixel value of pixel $d=(A+2B+C+2)>>2$

Prediction pixel values of pixels $e$ and $k=(I+J+1)>>1$

Prediction pixel values of pixels $f$ and $l=(M+2I+J+2)>>2$

Prediction pixel values of pixels $i$ and $o=(J+K+1)>>1$

Prediction pixel values of pixels $j$ and $p=(I+2J+K+2)>>2$

Prediction pixel value of pixel $m=(K+L+1)>>1$

Prediction pixel value of pixel $n=(J+2K+L+2)>>2$ (15)

The mode 7 is a Vertical_Left Prediction mode, and is applied to only a case where the pixel values A, B, C, D, I, J, K, L, and M are "available". In this case, the prediction pixel values of the pixels a through p are generated like the following Expression (16).

Prediction pixel value of pixel $a=(A+B+1)>>1$

Prediction pixel values of pixels $b$ and $i=(B+C+1)>>1$

Prediction pixel values of pixels $c$ and $j=(C+D+1)>>1$

Prediction pixel values of pixels $d$ and $k=(D+E+1)>>1$

Prediction pixel value of pixel $l=(E+F+1)>>1$

Prediction pixel value of pixel $e=(A+2B+C+2)>>2$

Prediction pixel values of pixels $f$ and $m=(B+2C+D+2)>>2$

Prediction pixel values of pixels $g$ and $n=(C+2D+E+2)>>2$

Prediction pixel values of pixels $h$ and $o=(D+2E+F+2)>>2$

Prediction pixel value of pixel $p=(E+2F+G+2)>>2$ (16)

The mode 8 is a Horizontal_Up Prediction mode, and is applied to only a case where the pixel values A, B, C, D, I, J, K, L, and M are "available". In this case, the prediction pixel values of the pixels a through p are generated like the following Expression (17).

Prediction pixel value of pixel $a=(I+J+1)>>1$

Prediction pixel value of pixel $b=(I+2J+K+2)>>2$

Prediction pixel values of pixels c and $e=(J+K+1)>>1$

Prediction pixel values of pixels d and $f=(J+2K+L+2)>>2$

Prediction pixel values of pixels g and $i=(K+L+1)>>1$

Prediction pixel values of pixels h and $j=(K+3L+2)>>2$

Prediction pixel values of pixels k,l,m,n,o, and $p=L$ (17)

Next, the encoding system of the 4×4-pixel intra-prediction mode (Intra_4×4_pred_mode) for luminance signals will be described with reference to FIG. 13. With the example in FIG. 13, the current block C to be encoded, which is made up of 4×4 pixels, is shown, and a block A and a block B, which are adjacent to the current block C and are made up of 4×4 pixels, are shown.

In this case, it can be conceived that the Intra_4×4_pred_mode in the current block C, and the Intra_4×4_pred_mode in the block A and block B have high correlation. Encoding processing is performed as follows using this correlation, whereby higher encoding efficiency can be realized.

Figures 12, 13, 14:
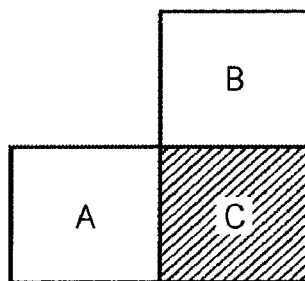
FIG. 12 is a diagram for describing the direction of intra prediction of 4×4 pixels.
FIG. 13 is a diagram for describing intra prediction of 4×4 pixels.
FIG. 14 is a diagram for describing encoding of the intra prediction mode of 4×4 pixels for luminance signals.

Specifically, with the example in FIG. 13, the Intra_4×4_pred_mode in the block A and block B are taken as Intra_4×4_pred_modeA and Intra_4×4_pred_modeB respectively, and MostProbableMode is defined as the following Expression (18).

MostProbableMode=Min(Intra_4×4-pred_modeA, Intra_4×4_pred_modeB) (18)

That is to say, of the block A and block B, one to which a smaller mode_number is assigned is taken as MostProbableMode.

Two values called as prev_intra4×4_pred_mode_flag [luma4×4Blkldx] are defined within a bit stream as parameters as to the current block C, and decoding processing is performed by processing based on the pseudo-code shown in the following Expression (19), whereby the values of Intra_4×4_pred_mode and Intra4×4PredMode[luma4×4Blkldx] as to the current block C can be obtained.

if(prev_intra4×4_pred_mode_flag[luma4×4Blkldx])
  Intra4×4PredMode[luma4×4Bkldx]=MostProbableMode else if(rem_intra4×4_pred_mode[luma4×4Blkldx]<MostProbableMode)

Intra4×4PredMode[luma4×4Blkldx]=rem_intra4×4_pred_mode[luma4×4Blkldx]

else

Intra4×4PredMode[luma4×4Blkldx]=rem_intra4×4_pred_mode[luma4×4Blkldx]+1 (19)

Figure 15:
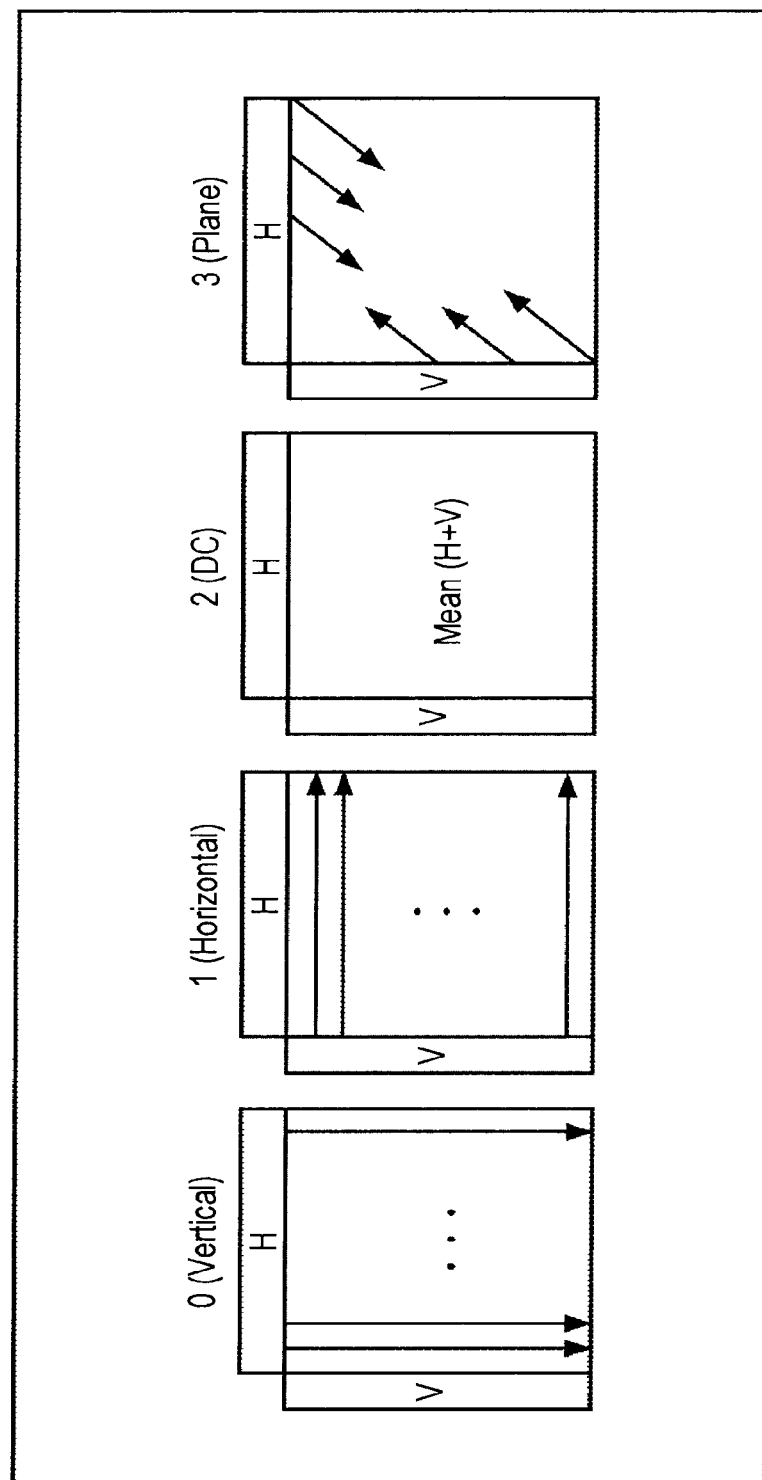
FIG. 15 is a diagram illustrating the kinds of intra prediction mode of 16×16 pixels for luminance signals.

Next, the 16×16-pixel intra prediction mode will be described. FIG. 14 and FIG. 15 are diagrams showing the four kinds of the 16×16-pixel intra prediction modes for luminance signals (Intra_16×16_pred_mode).

Figures 16, 17:
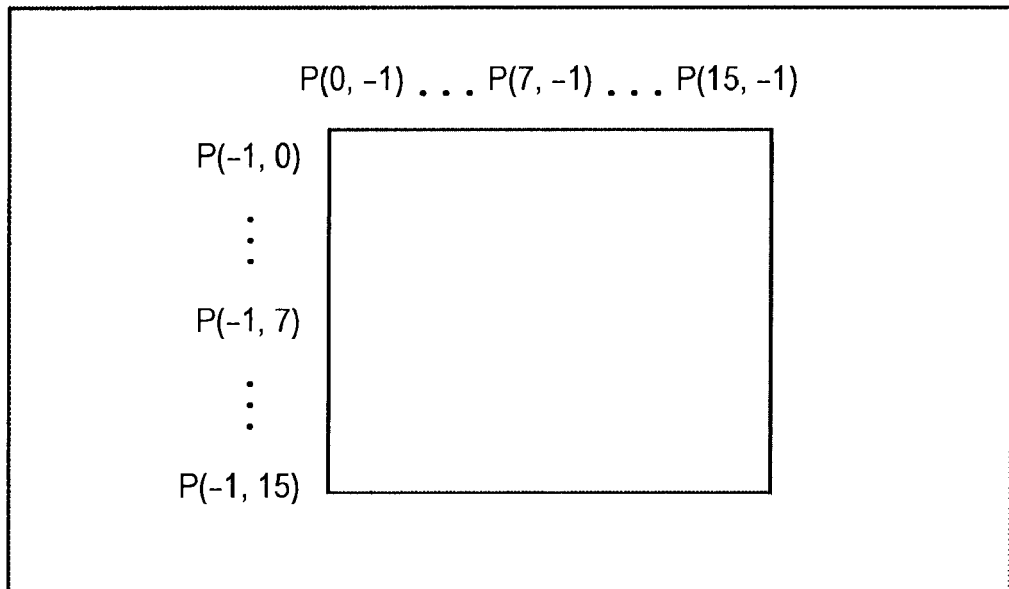
FIG. 16 is a diagram illustrating the kinds of intra prediction mode of 16×16 pixels for luminance signals.
FIG. 17 is a diagram for describing intra prediction of 16×16 pixels.

The four kinds of intra prediction modes will be described wither reference to FIG. 16. With the example in FIG. 16, the current macro block A to be subjected to intra-processing is shown, and P(x, y); x, y=−1, 0, . . . , 15 represents the pixel value of a pixel adjacent to the current macro block A.

The mode 0 is a Vertical Prediction mode, and is applied only when P(x, −1); x, y=−1, 0, . . . , 15 is "available". In this case, the prediction pixel value Pred(x, y) of each pixel of the current macro block A is generated like the following Expression (20).

$$\text{Pred}(x,y)=P(x,-1); x,y=0,\ldots,15 \qquad (20)$$

The mode 1 is a Horizontal Prediction mode, and is applied only when P(−1, y); x, y=−1, 0, . . . , 15 is "available". In this case, the prediction pixel value Pred(x, y) of each pixel of the current macro block A is generated like the following Expression (21).

$$\text{Pred}(x,y)=P(-1,y); x,y=0,\ldots,15 \qquad (21)$$

The mode 2 is a DC Prediction mode, and in the event that all of P(x, −1) and P(−1, y); x, y=−1, 0, . . . , 15 are "available", the prediction pixel value Pred(x, y) of each pixel of the current macro block A is generated like the following Expression (22).

[Mathematical expression 5]

$$Pred(x, y) = \left[\sum_{x'=0}^{15} P(x', -1) + \sum_{y'=0}^{15} P(-1, y') + 16\right] >> 5 \qquad (22)$$

with $x, y = 0, \ldots, 15$

Also, in the event that P(x, −1); x, y=−1, 0, . . . , 15 is "unavailable", the prediction pixel value Pred(x, y) of each pixel of the current macro block A is generated like the following Expression (23).

[Mathematical expression 6]

$$Pred(x, y) = \left[\sum_{y'=0}^{15} P(-1, y') + 8\right] >> 4 \text{ with} \qquad (23)$$

$x, y = 0, \ldots, 15$

In the event that P(−1, y); x, y=−1, 0, . . . , 15 is "unavailable", the prediction pixel value Pred(x, y) of each pixel of the current macro block A is generated like the following Expression (24).

[Mathematical expression 7]

$$Pred(x, y) = \left[\sum_{y'=0}^{15} P(x', -1) + 8\right] >> 4 \text{ with} \qquad (24)$$

$x, y = 0, \ldots, 15$

In the event that all of P(x, −1) and P(−1, y); x, y=−1, 0, . . . , 15 are "unavailable", 128 is employed as the prediction pixel value.

The mode 3 is a Plane Prediction mode, and is applied only when all of P(x, −1) and P(−1, y); x, y=−1, 0, . . . , 15 are "available". In this case, the prediction pixel value Pred(x, y) of each pixel of the current macro block A is generated like the following Expression (25).

[Mathematical expression 8]

$$Pred(x, y) = \text{Clip1}((a + b \cdot (x - 7) + c \cdot (y - 7) + 16) >> 5) \quad (25)$$
$$a = 16 \cdot (P(-1, 15) + P(15, -1))$$
$$b = (5 \cdot H + 32) >> 6$$
$$c = (5 \cdot V + 32) >> 6$$
$$H = \sum_{x=1}^{8} x \cdot (P(7 + x, -1) - P(7 - x, -1))$$
$$V = \sum_{y=1}^{8} y \cdot (P(-1, 7 + y) - P(-1, 7 - y))$$

Next, the intra prediction modes as to color difference signals will be described. FIG. 17 is a diagram showing the four kinds of intra prediction modes for color difference signals (Intra_chroma_pred_mode). The intra prediction modes for color difference signals may be set independently from the intra prediction modes for luminance signals. The intra prediction modes as to color difference signals conform to the above-mentioned 16×16-pixel intra prediction modes for luminance signals.

However, the 16×16-pixel intra prediction modes for luminance signals take a 16×16-pixel block as an object, but on the other hand, the intra prediction modes as to color difference signals take an 8×8-pixel block as an object. Further, as shown in the above-mentioned FIG. 14 and FIG. 17, mode numbers between both do not correspond.

Now, let us conform to the definitions of the pixel values of the current block A in the 16×16-pixel intra prediction mode, and an adjacent pixel value. For example, let us say that the pixel value of a pixel adjacent to the current macro block A (8×8 pixels in the event of color difference) to be subjected to intra processing is taken as P(x, y); x, y=−1, 0, . . . , 7.

The mode 0 is a DC Prediction mode, and in the event that all of P(x, −1) and P(−1, y); x, y=−1, 0, . . . , 7 are "available", the prediction pixel value Pred(x, y) of each pixel of the current macro block A is generated like the following Expression (26).

[Mathematical expression 9]

$$Pred(x, y) = \left[\left(\sum_{n=0}^{7} (P(-1, n) + P(n, -1))\right) + 8\right] >> 4 \text{ with} \quad (26)$$
$$x, y = 0, \ldots, 7$$

Also, in the event that P(−1, y); x, y=−1, 0, . . . , 7 is "unavailable", the prediction pixel value Pred(x, y) of each pixel of the current macro block A is generated like the following Expression (27).

[Mathematical expression 10]

$$Pred(x, y) = \left[\left(\sum_{n=0}^{7} P(n, -1)\right) + 4\right] >> 3 \text{ with } x, y = 0, \ldots 7 \quad (27)$$

Also, in the event that P(x, −1); x, y=−1, 0, . . . , 7 is "unavailable", the prediction pixel value Pred(x, y) of each pixel of the current macro block A is generated like the following Expression (28).

[Mathematical expression 11]

$$Pred(x, y) = \left[\left(\sum_{n=0}^{7} P(-1, n)\right) + 4\right] >> 3 \text{ with } x, y = 0, \ldots, 7 \quad (28)$$

The mode 1 is a Horizontal Prediction mode, and is applied only when P(−1, y); x, y=−1, 0, . . . , 7 is "available". In this case, the prediction pixel value Pred(x, y) of each pixel of the current macro block A is generated like the following Expression (29).

$$Pred(x,y) = P(-1, y); x, y = 0, \ldots, 7 \quad (29)$$

The mode 2 is a Vertical Prediction mode, and is applied only when P(x, −1); x, y=−1, 0, . . . , 7 is "available". In this case, the prediction pixel value Pred(x, y) of each pixel of the current macro block A is generated like the following Expression (30).

$$Pred(x,y) = P(x, -1); x, y = 0, \ldots, 7 \quad (30)$$

The mode 3 is a Plane Prediction mode, and is applied only when P(x, −1) and P(−1, y); x, y=−1, 0, . . . , 7 are "available". In this case, the prediction pixel value Pred(x, y) of each pixel of the current macro block A is generated like the following Expression (31).

[Mathematical expression 12]

$$Pred(x, y) = \text{Clip1}(a + b \cdot (x - 3) + c \cdot (y - 3) + 16) >> 5; \quad (31)$$
$$x, y = 0, \ldots 7$$
$$a = 16 \cdot (P(-1, 7) + P(7, -1))$$
$$b = (17 \cdot H + 16) >> 5$$
$$c = (17 \cdot V + 16) >> 5$$
$$H = \sum_{x=1}^{4} x \cdot [P(3 + x, -1) - P(3 - x, -1)]$$
$$V = \sum_{y=1}^{4} y \cdot [P(-1, 3 + y) - P(-1, 3 - y)]$$

As described above, the intra-prediction modes for luminance signals include the nine kinds of prediction modes of 4×4-pixel and 8×8-pixel block units, and the four kinds of prediction modes of 16×16-pixel macro block units. The modes of these block units are set for each macro block unit. The intra prediction modes for color difference signals include the four kinds of prediction modes of 8×8-pixel block units. The intra prediction modes for color difference signals may be set independently from the intra prediction modes for luminance signals.

Also, with regard to the 4×4-pixel intra prediction modes (intra 4×4 prediction modes), and the 8×8-pixel intra prediction modes (intra 8×8 prediction modes) for luminance signals, one intra prediction mode is set for each 4×4-pixel and 8×8-pixel luminance signal block. With regard to the 16×16-pixel intra prediction mode (intra 16×16 prediction mode) for luminance signals and the intra prediction modes for color difference signals, one prediction mode is set as to one macro block.

Note that the kinds of prediction modes correspond to directions indicated with the above-mentioned numbers 0, 1, 3 through 8 in FIG. 1. The prediction mode 2 is average value prediction.

As described above, the intra prediction according to the H.264/AVC system is performed with integer pixel precision. On the other hand, with the image encoding device 51, intra prediction with fraction pixel precision is performed.

[Operation of Intra Prediction with Fraction Pixel Precision]

Next, operation for realizing intra prediction with fraction pixel precision will be described with reference to FIG. 18. Note that the example in FIG. 18 illustrates an example in the event the current block has 4×4 pixels.

Figure 18:
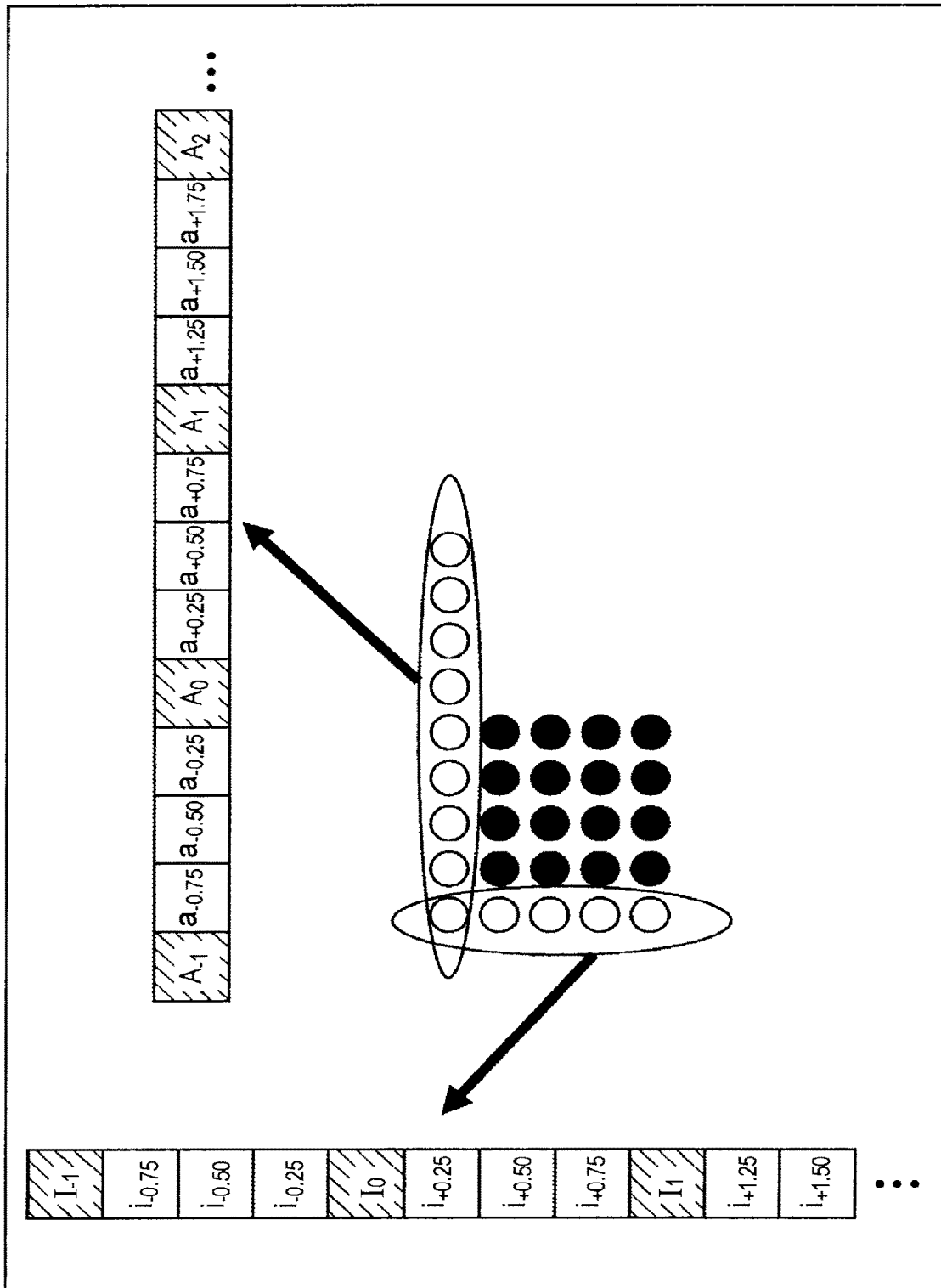
FIG. 18 is a diagram for describing operation for realizing intra prediction with fractional pixel precision.

In the case of the example in FIG. 18, solid circles represent the pixels f the current block to be subjected to intra prediction, and white circles represent adjacent pixels adjacent to the current block. Further, in details, of the adjacent pixels that are the white circles, the upper left adjacent pixel adjacent to the upper left portion of the current block is $A_{-1}$ and also $I_{-1}$, and this pixel is equivalent to a pixel of which the pixel value is M in FIG. 12. Of the adjacent pixels that are white circles, the upper adjacent pixels adjacent to the upper portion of the current block are $A_0$, $A_1$, $A_2$, and so on, and these pixels are equivalent to pixels of which the pixel values are A through H in FIG. 12. Of the adjacent pixels that are white circles, the left adjacent pixels adjacent to the left portion of the current block are $I_0$, $I_1$, $I_2$, and so on, and these pixels are equivalent to pixels of which the pixel values are I through L in FIG. 12.

Also, $a_{-0.5}$, $a_{+0.5}$, and so on, and $i_{-0.5}$, $i_{+0.5}$, and so on shown between the adjacent pixels represent pixels with ½ pixel precision. Further, $a_{-0.75}$, $a_{-0.25}$, $a_{+0.25}$, $a_{+0.75}$, and so on, and $i_{-0.75}$, $i_{-0.25}$, $i_{+0.25}$, $i_{+0.75}$, and so on shown between the pixels $a_{-0.5}$, $a_{+0.5}$, and so on, and $i_{-0.5}$, $i_{+0.5}$, and so on represent pixels with ¼ pixel precision.

First, as a first operation, with the intra prediction unit 74, intra prediction is performed as to the intra prediction modes using the pixel values A through M shown in FIG. 12, and the optimal intra prediction is determined out of the intra prediction modes. In the event that the current block is 4×4, this optimal intra prediction mode is one of the nine prediction modes in FIG. 10 or FIG. 11.

For example, let us say that the mode 0 (Vertical Prediction mode) has been selected as the optimal intra prediction mode. At this time, adjacent pixels used for prediction of the current block are the pixels $A_0$, $A_1$, $A_2$, and $A_3$ in FIG. 18 of which the pixel values are pixel values A through D in FIG. 12.

As a second operation, with the adjacent pixel interpolation unit 75, according to the 6-tap FIR filter according to the H.264/AVC system described above with reference to FIG. 4, pixels $a_{-0.5}$, $a_{+0.5}$, and so on with ½ pixel precision in FIG. 18 are generated. That is to say, the pixel $a_{-0.5}$ is shown with the following Expression (32).

$$a_{-0.5}=(A_{-2}-5*A_{-1}+20*A_0+20*A_1-5*A_1+A_2+16)>>5 \quad (32)$$

This may be applied to other pixels $a_{+0.5}$, $a_{+1.5}$, and so forth with ½ pixel precision.

As a third operation, with the adjacent pixel interpolation unit 75, pixels $a_{-0.75}$, $a_{-0.25}$, $a_{+0.25}$, and $a_{+0.75}$ with ¼ pixel precision in FIG. 18 are generated from pixels $A_0$, $A_1$, $A_2$, $A_3$, and pixels $a_{-0.5}$, $a_{+0.5}$, and so forth by linear interpolation. Specifically, the pixel $a_{+0.25}$ is indicated by the following Expression (33).

$$a_{-0.5}=A_0+a_{+0.5}+1)>>2 \quad (33)$$

This may be applied to other pixels with ¼ pixel precision.

As a fourth operation, with the intra prediction unit 74, in the case of the mode 0, values −0.75, −0.50, −0.25, +0.25, +0.50, and +0.75 that are phase differences between an integer pixel and each of the fractional pixel precisions are taken as candidates in the shift amount in the horizontal direction, and the optimal shift amount is determined.

For example, in the event that the shift amount is +0.25, intra prediction is performed using the pixel values of pixels $a_{+0.25}$, $a_{+1.25}$, $a_{+2.25}$, and $a_{+3.25}$ instead of the pixel values of the pixels $A_0$, $A_1$, $A_2$, and $A_3$.

In this way, the optimal shift amount is determined as to the optimal intra prediction mode selected in the first operation. For example, there may be a case where the shift amount is 0 is determined to be the optimal, and the pixel value of an integer pixel is used.

Note that, of the nine prediction modes shown in FIG. 10 or FIG. 11, with regard to the mode 2 (DC prediction mode), average value processing is performed. Accordingly, even when performing shift, this does not directly get involved with improvement in encoding efficiency, and accordingly, the above-mentioned operation is inhibited and not performed.

With regard to the mode 0 (Vertical Prediction mode), mode 3 (Diagonal_Down_Left Prediction mode), or mode 7 (Vertical_Left Prediction mode), shift only with the upper adjacent pixels $A_0$, $A_1$, $A_2$, and so on in FIG. 18 serves as a candidate.

With regard to the mode 1 (Horizontal Prediction mode) or mode 8 (Horizontal_Up Prediction mode), shift only with the left adjacent pixels $I_0$, $I_1$, $I_2$, and so on in FIG. 18 serves as a candidate.

With regard to the other modes (modes 4 through 6), shift has to be taken into consideration regarding both of the upper adjacent pixels and left adjacent pixels.

Also, with regard to the upper adjacent pixels, only the shift amount in the horizontal direction is determined, and with regard to the left adjacent pixels, only the shift amount in the vertical direction is determined.

The above-mentioned first through fourth operations are preformed to determine the optimal shift amount, whereby the choices of pixel values used in the intra prediction mode can be increased, and further optimal intra prediction can be performed. Thus, encoding efficiency in intra prediction can further be improved.

Also, with the H.264/AVC system, as described above with reference to FIG. 4, the circuit of a 6-tap FIR filter only used for inter motion prediction compensation can also effectively be used for intra prediction. Thus, efficiency can be improved without increasing the circuit.

Further, there can be performed intra prediction with further finer resolution than 22.5 degrees that is resolution for intra prediction determined in the H.264/AVC system.

[Advantageous Effect Example of Intra Prediction with Fractional Pixel Precision]

Figure 19:
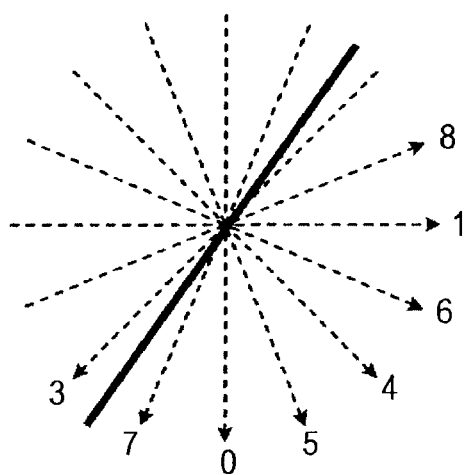
FIG. 19 is a diagram for describing an advantageous effect example of intra prediction with fractional pixel precision.

With the example in FIG. 19, dotted lines represent the directions of the prediction modes of intra prediction according to the H.264/AVC system described above with reference to FIG. 1. Numbers appended with the dotted lines correspond to the numbers of the nine prediction modes shown in FIG. 10 or FIG. 11, respectively. Note that the mode 2 is average value prediction, and accordingly, the number thereof is not shown.

With the H.264/AVC system, intra prediction can be performed only with resolution of 22.5 degrees shown in dotted lines. On the other hand, with the image encoding device 51, intra prediction with fractional pixel precision is performed, intra prediction with further finer resolution than 22.5 degrees as represented with a thick line. Thus, in particular, encoding efficiency as to texture having an oblique edge can be improved.

[Description of Intra Prediction Processing]

Next, intra prediction processing serving as the above-mentioned operations will be described with reference to the flowchart in FIG. 20. Note that this intra prediction processing is the intra prediction processing in step S31 in FIG. 8, and with the example in FIG. 20, description will be made a case of luminance signals as an example.

In step S41, the optimal mode determining unit 82 performs intra prediction as to the intra prediction modes of 4×4 pixels, 8×8 pixels, and 16×16 pixels.

As described above, with the intra 4×4 prediction modes and the intra 8×8 prediction modes, there are provided nine kinds of prediction modes, and one prediction mode may be defined for each block, respectively. With regard to the intra 16×16 prediction mode, and the intra prediction mode for color difference signals, one prediction mode may be defined as to one macro block.

The optimal mode determining unit 82 refers to a decoded adjacent pixel read out from the adjacent image buffer 81 to subject a pixel of the block to be processed to intra prediction using all kinds of the intra prediction modes. Thus, prediction images are generated regarding all kinds of the prediction modes of the intra prediction modes. Note that as for a decoded pixel to be referenced, a pixel not subjected to deblocking filtering by the deblocking filter 71 is used.

In step S42, the optimal mode determining unit 82 calculates a cost function value as to the intra prediction modes of 4×4 pixels, 8×8 pixels, and 16×16 pixels. Here, calculation of a cost function value is performed based on one of the techniques of a High Complexity mode or Low Complexity mode. These modes are determined in JM (Joint Model) that is reference software in the H.264/AVC system.

Specifically, in the High Complexity mode, tentatively, up to encoding processing is performed as to all of the prediction modes serving as candidates as the processing in step S41. A cost function value represented with the following Expression (34) is calculated as to the prediction modes, and a prediction mode that provides the minimum value thereof is selected as the optimal prediction mode.

$$\text{Cost(Mode)} = D + \lambda \cdot R \tag{34}$$

D denotes difference (distortion) between the raw image and a decoded image, R denotes a generated code amount including an orthogonal transform coefficient, and λ denotes a LaGrange multiplier to be provided as a function of a quantization parameter QP.

On the other hand, in the Low Complexity mode, a prediction image is generated, and up to header bits of motion vector information, prediction mode information, flag information, and so forth are calculated as to all of the prediction modes serving as candidates as the processing in step S41. A cost function value represented with the following Expression (35) is calculated as to the prediction modes, and a prediction mode that provides the minimum value thereof is selected as the optimal prediction mode.

$$\text{Cost(Mode)} = D + \text{QPtoQuant}(QP) \cdot \text{Header\_Bit} \tag{35}$$

D denotes difference (distortion) between the raw image and a decoded image, Header_Bit denotes header bits as to a prediction mode, and QPtoQuant is a function to be provided as a function of the quantization parameter QP.

In the Low Complexity mode, a prediction image is only generated as to all of the prediction modes, and there is no need to perform encoding processing and decoding processing, and accordingly, a calculation amount can be reduced.

In step S43, the optimal mode determining unit 82 determines the optimal mode as to the intra prediction modes of 4×4 pixels, 8×8 pixels, and 16×16 pixels. Specifically, as described above, in the event of the intra 4×4 prediction mode and intra 8×8 prediction mode, the number of prediction mode types is nine, and in the event of the intra 16×16 prediction mode, the number of prediction mode types is four. Accordingly, the optimal mode determining unit 82 determines, based on the cost function values calculated in step S42, the optimal intra 4×4 prediction mode, optimal intra 8×8 prediction mode, and optimal intra 16×16 prediction mode out thereof.

In step S44, the optimal mode determining unit 82 selects the optimal intra prediction mode out of the optimal modes determined as to the intra prediction modes of 4×4 pixels, 8×8 pixels, and 16×16 pixels based on the cost function values calculated in step S42. Specifically, the optimal mode determining unit 82 selects a mode of which the cost function value is the minimum value out of the optimal modes determined as to 4×4 pixels, 8×8 pixels, and 16×16 pixels, as the optimal intra prediction mode.

The determined prediction mode information is supplied to the mode determining unit 91, optimal shift amount determining unit 83, and prediction image generating unit 84. Also, the cost function value corresponding to the prediction mode is also supplied to the prediction image generating unit 84.

In step S45, the adjacent pixel interpolation unit 75 and optimal shift amount determining unit 83 execute adjacent interpolation processing. The details of the adjacent interpolation processing in step S45 will be described later with reference to FIG. 21, but according to this processing, the optimal shift amount is determined in the shift direction according to the determined optimal intra prediction mode. Information relating to the determined optimal shift amount is supplied to the prediction image generating unit 84.

In step S46, the prediction image generating unit 84 generates a prediction image using the adjacent pixel of which the phase has been shifted with the optimal shift amount.

Specifically, the prediction image generating unit 84 reads out the adjacent pixel corresponding to the current block to be subjected to intra prediction form the adjacent image buffer 81. The prediction image generating unit 84 then shifts the phase of the read adjacent pixel in the phase direction according to the prediction mode with the optimal shift amount by the 6-tap FIR filter and linear interpolation. The prediction image generating unit 84 performs intra prediction in the prediction mode determined by the optimal mode determining unit 82 using the adjacent pixel of which the phase has been shifted to generate a prediction image of the current block, and supplies the generated prediction image and the corresponding cost function value to the prediction image selecting unit 77.

Note that in the event that the optimal shift amount is 0, the pixel value of the adjacent pixel from the adjacent image buffer 81 is used.

In the event that the prediction image generated in the optimal intra prediction mode by the prediction image selecting unit 77 has been selected, information indicating the optimal intra prediction, and information of the shift amount are supplied to the lossless encoding unit 66 by the prediction image generating unit 84. These are then encoded at the lossless encoding unit 66, and added to the header information of the compressed image (above-mentioned step S23 in FIG. 7).

Note that as for encoding of the information of the shift amount, difference between the determined shift amount of the current block, and the shift amount in a block that provides the MostProbableMode described above with reference to FIG. 13 is encoded.

However, for example, in the event that the MostProbableMode is the mode 2 (DC prediction), and the prediction mode of the current block is the mode 0 (Vertical prediction), there is no shift amount in the horizontal direction in the block that provides the MostProbableMode. Also, even with a situation wherein this block is a intra macro block in inter slice, there is no shift amount in the horizontal direction in the block that provides the MostProbableMode.

In such a case, difference encoding processing will be performed assuming that the shift amount in the horizontal direction in the block that provides the MostProbableMode is 0.

[Description of Adjacent Pixel Interpolation Processing]

Figure 21:
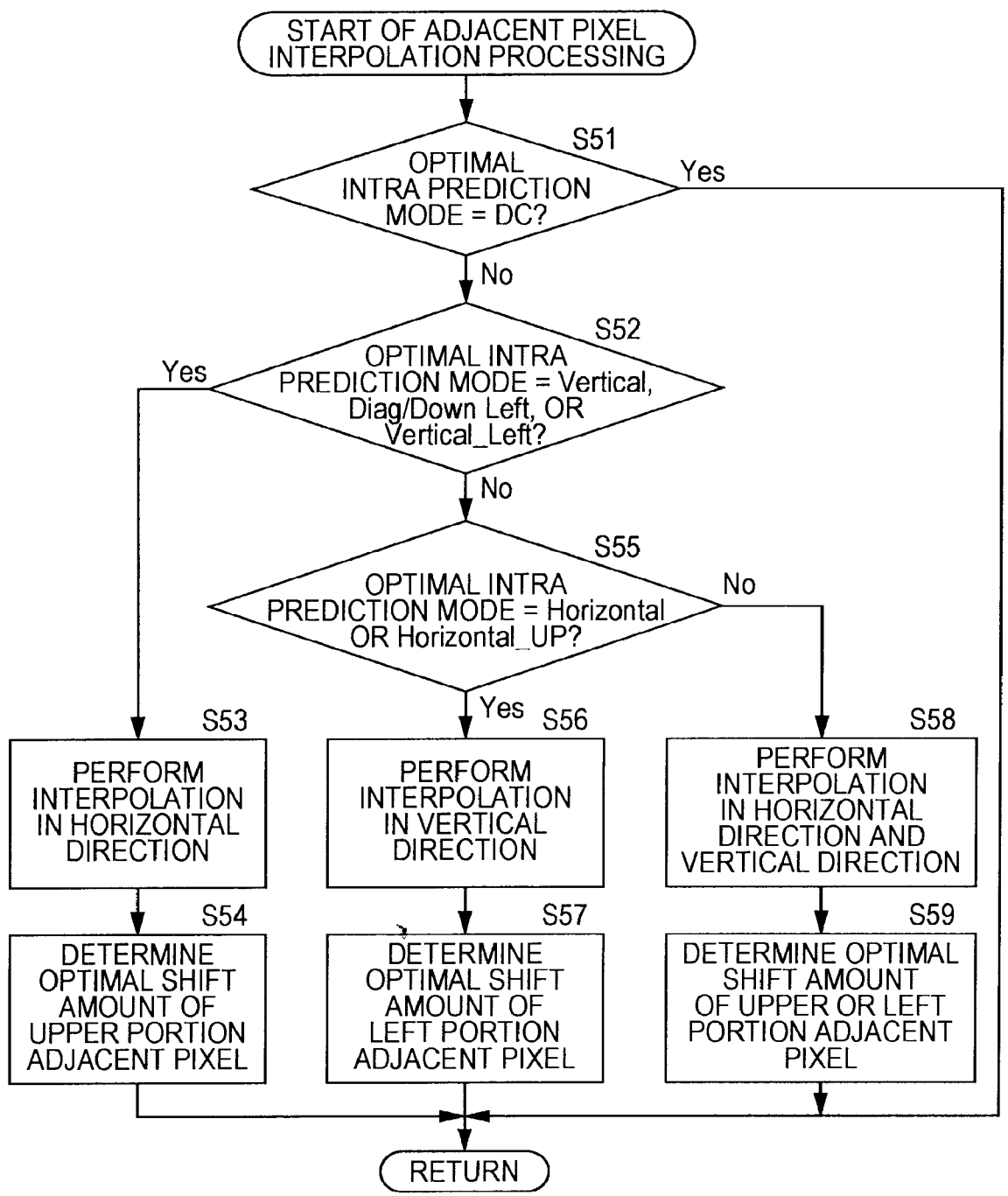
FIG. 21 is a flowchart for describing adjacent pixel interpolation processing in step S45 in FIG. 20.

Next, the adjacent pixel interpolation processing in step S45 in FIG. 20 will be described with reference to the flowchart in FIG. 21. With the example in FIG. 21, description will be made regarding a case where the current block is 4×4.

The information of the prediction mode determined by the optimal mode determining unit 82 is supplied to the mode determining unit 91. In step S51, the mode determining unit 91 determines whether or not the optimal intra prediction mode is the DC mode. In the event that determination is made in step S51 that the optimal intra prediction mode is not the DC mode, the processing proceeds to step S52.

In step S52, the mode determining unit 91 determines whether the optimal intra prediction mode is the Vertical Prediction mode, Diagonal_Down_Left Prediction mode, or Vertical_Left Prediction mode.

In the event that determination is made in step S52 that the optimal intra prediction mode is the Vertical Prediction mode, Diagonal_Down_Left Prediction mode, or Vertical_Left Prediction mode, the processing proceeds to step S53.

In step 353, the mode determining unit 91 outputs a control signal to the horizontal direction interpolation unit 92 to perform interpolation in the horizontal direction. Specifically, in response to the control signal from the mode determining unit 91, the horizontal direction interpolation unit 92 reads out an upper adjacent pixel from the adjacent image buffer 81, and shifts the phase in the horizontal direction of the read upper adjacent pixel by the 6-tap FIR filter and linear interpolation. The horizontal direction interpolation unit 92 supplies the information of the interpolated upper adjacent pixel to the optimal shift amount determining unit 83.

In step S54, the optimal shift amount determining unit 83 determines the optimal shift amount of the upper adjacent pixel of −0.75 through +0.75 regarding the prediction mode determined by the optimal mode determining unit 82. Note that, with this determination, the image of the current block to be subjected to intra prediction, and the information of the upper adjacent pixel read out from the adjacent image buffer 81, and the interpolated upper adjacent pixel are used. Also, at this time, the optimal shift amount regarding the left adjacent pixels is set to 0. The information of the determined optimal shift amount is supplied to the prediction image generating unit 84.

In the event that determination is made in step S52 that the optimal intra prediction mode is not the Vertical Prediction mode, Diagonal_Down_Left Prediction mode, or Vertical_Left Prediction mode, the processing proceeds to step S55.

In step S55, the mode determining unit 91 determines whether the optimal intra prediction mode is the Horizontal Prediction mode or Horizontal_Up Prediction mode. In the event that determination is made in step S55 that the optimal intra prediction mode is the Horizontal Prediction mode or Horizontal_Up Prediction mode, the processing proceeds to step S56.

In step S56, the mode determining unit 91 outputs a control signal to the vertical direction interpolation unit 93 to perform interpolation in the vertical direction. Specifically, in response to the control signal from the mode determining unit 91, the vertical direction interpolation unit 93 reads out a left adjacent pixel from the adjacent image buffer 81, and shifts the phase in the vertical direction of the read left adjacent pixel by the 6-tap FIR filter and linear interpolation. The vertical direction interpolation unit 93 supplies the information of the interpolated left adjacent pixel to the optimal shift amount determining unit 83.

In step S57, the optimal shift amount determining unit 83 determines the optimal shift amount of the left adjacent pixel of −0.75 through +0.75 regarding the prediction mode determined by the optimal mode determining unit 82. Note that, with this determination, the image of the current block to be subjected to intra prediction, and the information of the left adjacent pixel read out from the adjacent image buffer 81, and the interpolated left adjacent pixel are used. Also, at this time, the optimal shift amount regarding the upper adjacent pixels is set to 0. The information of the determined optimal shift amount is supplied to the prediction image generating unit 84.

In the event that determination is made in step 355 that the optimal intra prediction mode is not the Horizontal Prediction mode or Horizontal_Up Prediction mode, the processing proceeds to step S58.

In step S58, the mode determining unit 91 outputs a control signal to the horizontal direction interpolation unit 92 to perform interpolation in the horizontal direction, and outputs a control signal to the vertical direction interpolation unit 93 to perform interpolation in the vertical direction.

Specifically, in response to the control signal from the mode determining unit 91, the horizontal direction interpolation unit 92 reads out an upper adjacent pixel from the adjacent image buffer 81, and shifts the phase in the horizontal direction of the read upper adjacent pixel by the 6-tap FIR filter and linear interpolation. The horizontal direction interpolation unit 92 supplies the information of the interpolated upper adjacent pixel to the optimal shift amount determining unit 83.

Also, in response to the control signal from the mode determining unit 91, the vertical direction interpolation unit 93 reads out a left adjacent pixel from the adjacent image buffer 81, and shifts the phase in the vertical direction of the read left adjacent pixel by the 6-tap FIR filter and linear interpolation. The vertical direction interpolation unit 93 supplies the information of the interpolated left adjacent pixel to the optimal shift amount determining unit 83.

In step S59, the optimal shift amount determining unit 83 determines the optimal shift amounts of the upper and left adjacent pixels of −0.75 through +0.75 regarding the prediction mode determined by the optimal mode determining unit 82. With this determination, the image of the current block to be subjected to intra prediction, and the information of the upper and left adjacent pixels read out from the adjacent image buffer 81, and the interpolated upper and left adjacent pixels are used. The information of the determined optimal shift amounts is supplied to the prediction image generating unit 84.

On the other hand, in the event that determination is made in step S51 that the optimal intra prediction mode is the DC mode, the adjacent pixel interpolation processing is ended. Specifically, neither the horizontal direction interpolation unit 82 nor the vertical direction interpolation unit 83 operates, and with the optimal shift amount determining unit 83, the optimal shift amount is determined to be zero.

[Description of Inter Motion Prediction Processing]

Next, the inter motion prediction processing in step S32 in FIG. 8 will be described with reference to the flowchart in FIG. 22.

In step S61, the motion prediction/compensation unit 76 determines a motion vector and a reference image as to each of the eight kinds of the inter prediction modes made up of 16×16 pixels through 4×4 pixels. That is to say, a motion vector and a reference image are determined as to the block to be processed in each of the inter prediction modes.

In step S62, the motion prediction/compensation unit 76 subjects the reference image to motion prediction and compensation processing based on the motion vector determined in step S61 regarding each of the eight kinds of the inter prediction modes made up of 16×16 pixels through 4×4 pixels. According to this motion prediction and compensation processing, a prediction image in each of the inter prediction modes is generated.

In step S63, the motion prediction/compensation unit 76 generates motion vector information to be added to the compressed image regarding the motion vectors determined as to each of the eight kinds of the inter prediction modes made up of 16×16 pixels through 4×4 pixels. At this time, the motion vector generating method described above with reference to FIG. 5 is employed.

The generated motion vector information is also employed at the time of calculation of cost function values in the next step S64, and in the event that the corresponding prediction image has ultimately been selected by the prediction image selecting unit 77, this prediction image is output to the lossless encoding unit 66 along with the prediction mode information and reference frame information.

In step S64, the motion prediction/compensation unit 76 calculates the cost function value shown in the above-mentioned Expression (34) or Expression (35) as to each of the eight kinds of the inter prediction modes made up of 16×16 pixels through 4×4 pixels. The cost function value calculated here is employed at the time of determining the optimal inter prediction mode in the above-mentioned step S34 in FIG. 8.

Note that the operation principle according to the present invention is not restricted to the operations described above with reference to FIG. 18, FIG. 20 and FIG. 21. For example, an arrangement may be made wherein as to all of the intra prediction modes, the prediction values of all of the shift amounts serving as candidates are calculated, and residual error thereof is calculated, and the optimal intra prediction mode and optimal shift amount are determined. A configuration example of the intra prediction unit and adjacent pixel interpolation unit in the event of performing this operation will be shown in FIG. 23.

[Another Configuration Example of Intra Prediction Unit and Adjacent Pixel Interpolation Unit]

Figure 23:
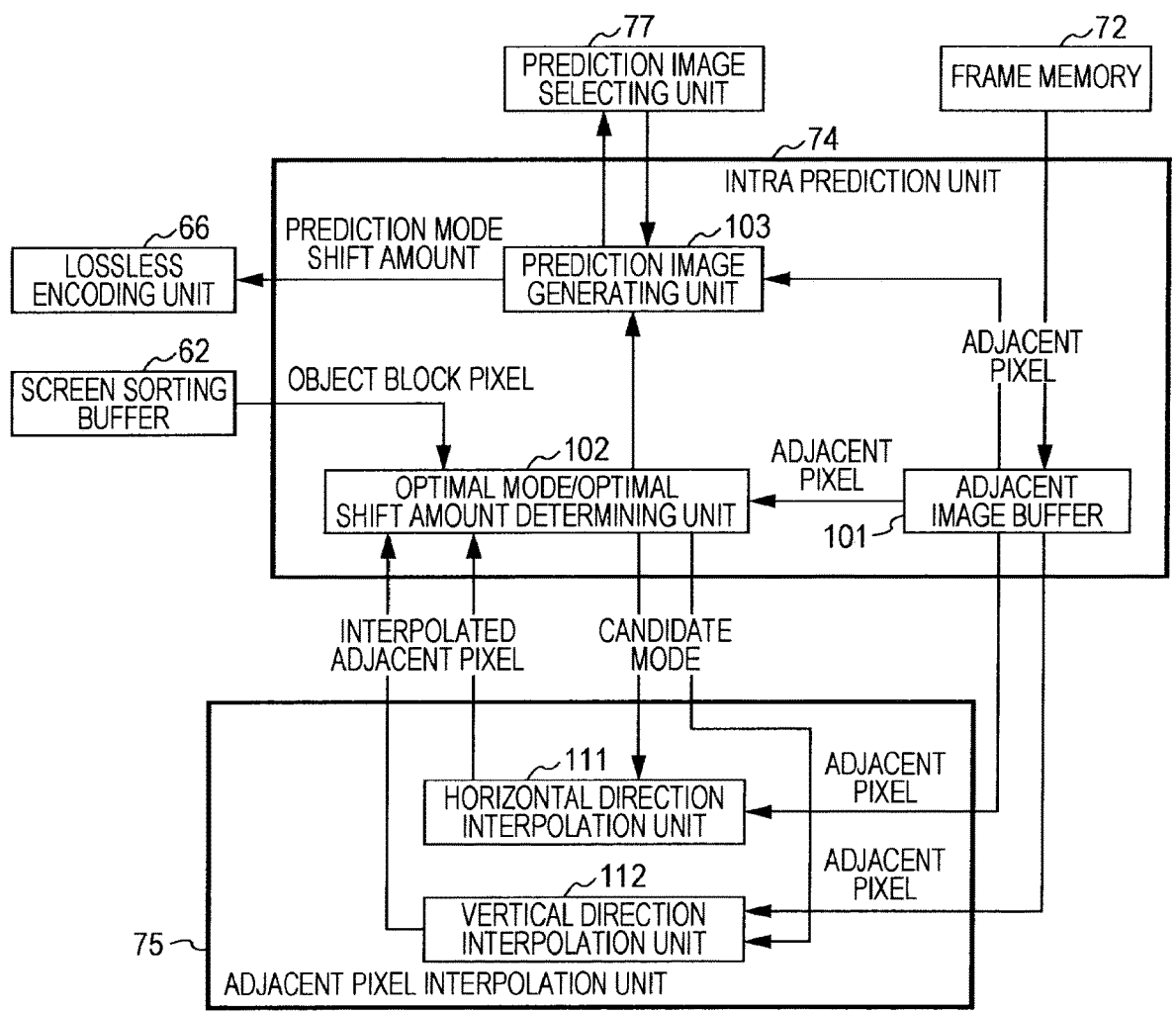
FIG. 23 is a block diagram illustrating another configuration example of the intra prediction unit and the adjacent pixel interpolation unit.

FIG. 23 is a block diagram illustrating another configuration example of the intra prediction unit and adjacent pixel interpolation unit.

In the case of the example in FIG. 23, the intra prediction unit 74 is configured of an adjacent image buffer 101, an optimal mode/optimal shift amount determining unit 102, and a prediction image generating unit 103.

The adjacent pixel interpolation unit 75 is configured of a horizontal direction interpolation unit 111, and a vertical direction interpolation unit 112.

The adjacent image buffer 101 accumulates an adjacent pixel of the current block to be subjected to intra prediction from the frame memory 72. In the case of FIG. 23 as well, drawing of the switch 73 is omitted, but in reality, an adjacent pixel is supplied from the frame memory 72 to the adjacent image buffer 101 via the switch 73.

The pixels of the current block to be subjected to intra prediction are input from the screen sorting buffer 62 to the optimal mode/optimal shift amount determining unit 102. The optimal mode/optimal shift amount determining unit 102 reads out an adjacent pixel corresponding to the current block to be subjected to intra prediction from the adjacent image buffer 101.

The optimal mode/optimal shift amount determining unit 102 supplies the information of a candidate intra prediction mode (hereafter, referred to as candidate mode) to the horizontal direction interpolation unit 111 and vertical direction interpolation unit 112. The information of the adjacent pixel interpolated according to the candidate mode is input to the optimal mode/optimal shift amount determining unit 102 from the horizontal direction interpolation unit 111 and vertical direction interpolation unit 112.

The optimal mode/optimal shift amount determining unit 102 performs intra prediction as to all of the candidate modes and all of the candidate shift amounts using the pixels of the current block to be subjected to intra prediction, the corresponding adjacent pixel, and the pixel value of the interpolated adjacent pixel to generate a prediction image. The optimal mode/optimal shift amount determining unit 102 then calculates a cost function value, prediction error, and so forth to determine the optimal intra prediction mode and the optimal shift amount out of all of the candidate modes and all of the shift amounts. The information of the determined prediction mode and shift amount is supplied to the prediction image generating unit 103. Note that, at this time, the cost function value as to the prediction mode is also supplied to the prediction image generating unit 103.

The prediction image generating unit 103 reads out an adjacent pixel corresponding to the current block to be subjected to intra prediction from the adjacent image buffer 101, and shifts the phase of the read adjacent pixel in the phase direction according to the prediction mode by the 6-tap FIR filter and linear interpolation with the optimal shift amount.

The prediction image generating unit 103 performs intra prediction with the optimal intra prediction mode determined by the optimal mode/optimal shift amount determining unit 102 using the adjacent pixel of which the phase has been shifted to generate a prediction image of the current block. The prediction image generating unit 103 outputs the generated prediction image and the corresponding cost function value to the prediction image selecting unit 77.

Also, in the event that the prediction image generated in the optimal intra prediction mode has been selected by the prediction image selecting unit 77, the prediction image generating unit 103 supplies information indicating the optimal intra prediction mode and the information of the shift amount to the lossless encoding unit 66.

The horizontal direction interpolation unit 111 and vertical direction interpolation unit 112 each read out an adjacent pixel from the adjacent image buffer 101 according to the candidate mode from the optimal mode/optimal shift amount determining unit 102. The horizontal direction interpolation unit 111 and vertical direction interpolation unit 112 shift the phase of the read adjacent pixel in the horizontal direction and vertical direction by the 6-tap FIR filter and linear interpolation, respectively.

[Another Description of Intra Prediction Processing]

Figure 24:
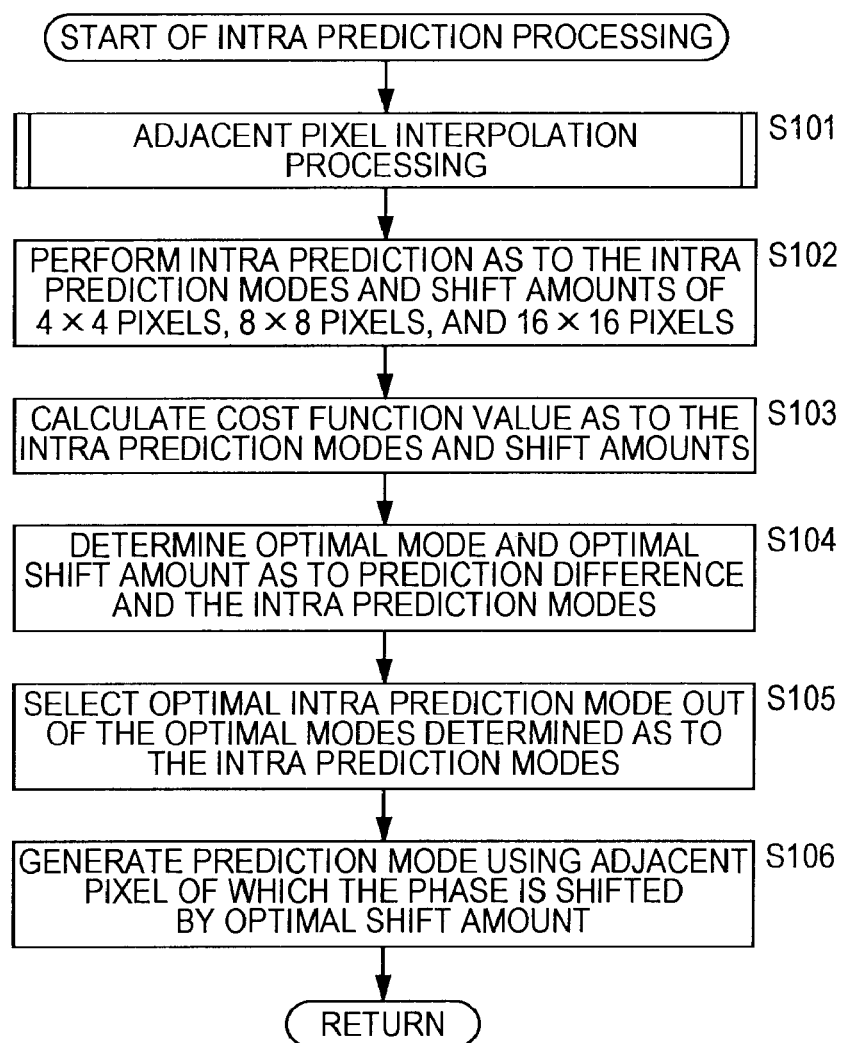
FIG. 24 is a flowchart for describing another example of intra prediction processing in step S31 in FIG. 8.

Next, the intra prediction processing that the intra prediction unit 74 and adjacent pixel interpolation unit 75 in FIG. 23 perform will be described with reference to the flowchart in FIG. 24. Note that this intra prediction processing is another example of the intra prediction processing in step S31 in FIG. 8.

The optimal mode/optimal shift amount determining unit 102 supplies information of the candidate intra prediction modes to the horizontal direction interpolation unit 111 and vertical direction interpolation unit 112.

In step S101, the horizontal direction interpolation unit 111 and vertical direction interpolation unit 112 execute the adjacent pixel interpolation processing as to all of the candidate intra prediction modes. Specifically, in step S101, the adjacent pixel interpolation processing is executed as to each of the intra prediction modes of 4×4 pixels, 8×8 pixels, and 16×16 pixels.

Figure 25:
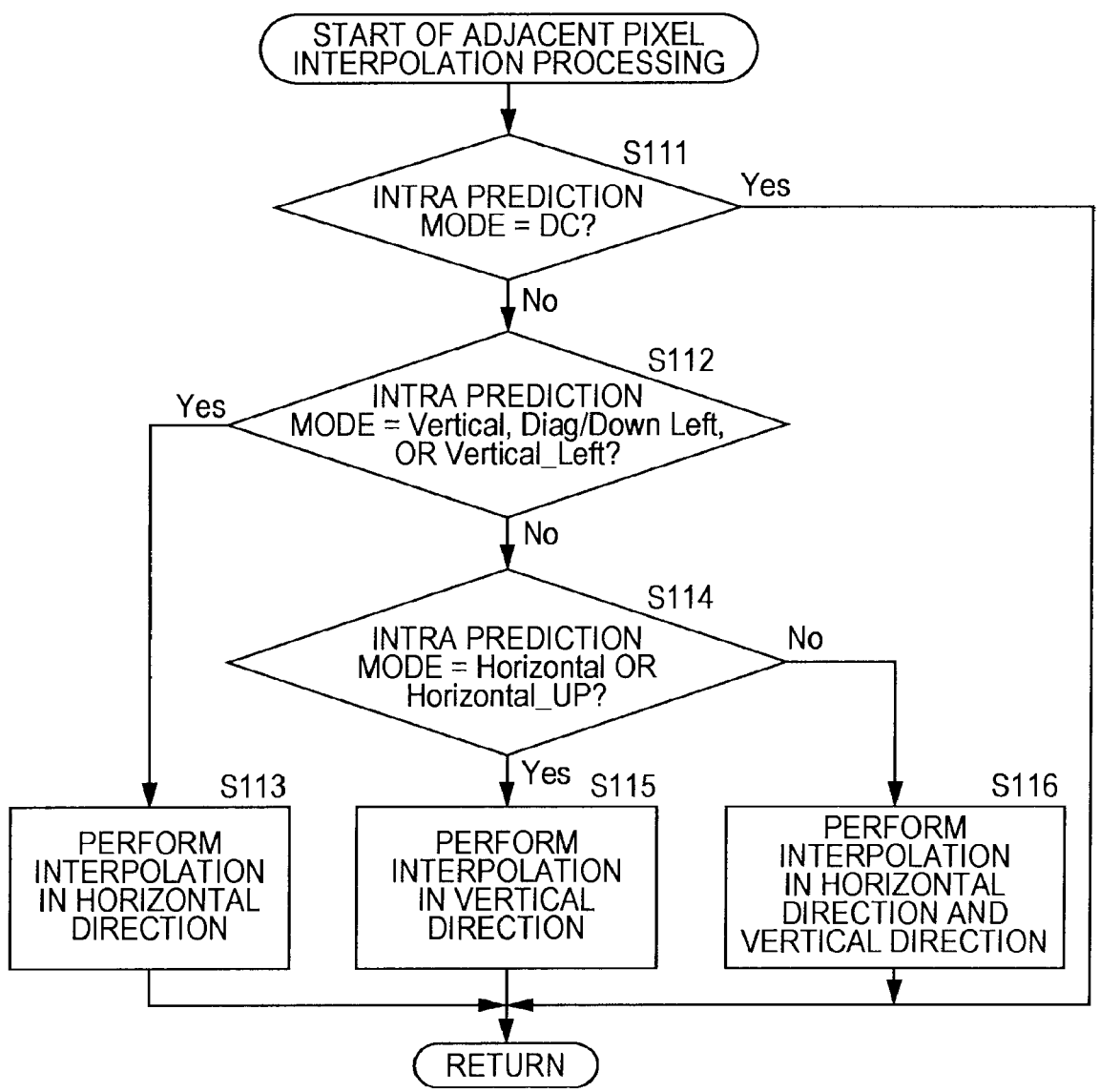
FIG. 25 is a flowchart for describing adjacent pixel interpolation processing in step S101 in FIG. 24.

The details of the adjacent interpolation processing in step S101 will be described later with reference to FIG. 25, but according to this processing, information of the adjacent pixel interpolated in the shift direction according to each of the intra prediction modes is supplied to the optimal mode/ optimal shift amount determining unit 102.

In step S102, the optimal mode/optimal shift amount determining unit 102 performs intra prediction as to the intra prediction modes of 4×4 pixels, 8×8 pixels, and 16×16 pixels, and the shift amounts.

Specifically, the optimal mode/optimal shift amount determining unit 102 performs intra prediction as to all of the intra prediction modes and all of the candidate shift amounts using the pixels of the current block to be subjected to intra prediction, the corresponding adjacent pixel, and the pixel value of the interpolated adjacent pixel. As a result thereof, prediction images are generated as to all of the intra prediction modes and all of the candidate shift amounts.

In step S103, the optimal mode/optimal shift amount determining unit 102 calculates the cost function value of the above-mentioned Expression (34) or Expression (35) as to each of the intra prediction modes of 4×4 pixels, 8×8 pixels, and 16×16 pixels wherein a prediction image is generated, and each shift amount.

In step S104, the optimal mode/optimal shift amount determining unit 102 compares the calculated cost function values, thereby determining the optimal mode and optimal shift amount as to each of the intra prediction modes of 4×4 pixels, 8×8 pixels, and 16×16 pixels.

In step S105, the optimal mode/optimal shift amount determining unit 102 selects the optimal intra prediction mode and optimal shift amount out of the optimal modes and optimal shift amounts determined in step S104 based on the cost function values calculated in step 3103. Specifically, the optimal intra prediction mode and optimal shift amount are selected out of the optimal modes and optimal shift amounts determined as to the intra prediction modes of 4×4 pixels, 8×8 pixels, and 16×16 pixels. Information of the selected prediction mode and shift amount is supplied to the prediction image generating unit 103 along with the corresponding cost function value.

In step S106, the prediction image generating unit 103 generates a prediction image using an adjacent pixel of which the phase has been shifted with the optimal shift amount.

Specifically, the prediction image generating unit 103 reads out the adjacent pixel corresponding to the current block to be subjected to intra prediction from the adjacent image buffer 101. The prediction image generating unit 103 then shifts the phase of the read adjacent pixel in the phase direction according to the determined prediction mode with the optimal shift amount by the 6-tap FIR filter and linear interpolation.

The prediction image generating unit 103 performs intra prediction in the prediction mode determined by the optimal mode/optimal shift amount determining unit 102 using the adjacent pixel of which the phase has been shifted to generate a prediction image of the current block. The generated prediction image is supplied to the prediction image selecting unit 77 along with the corresponding cost function value.

[Description of Adjacent Pixel. Interpolation Processing]

Next, the adjacent pixel interpolation processing in step S101 in FIG. 24 will be described with reference to the flowchart in FIG. 25. Note that this adjacent pixel interpolation processing is processing to be performed for each candidate intra prediction mode. Also, steps S111 through S116 in FIG. 25 perform the same processing as steps S51 through S53, S55, S56, and S58 in FIG. 21, and accordingly, detailed description thereof will be omitted as appropriate.

The information of the candidate intra prediction mode from the optimal mode/optimal shift amount determining unit 102 is supplied to the horizontal direction interpolation unit Ill and vertical direction interpolation unit 112. In step S111, the horizontal direction interpolation unit 111 and vertical direction interpolation unit 112 determine whether or not the candidate intra prediction mode is the DC mode. In the event that determination is made in step S111 that the candidate intra prediction mode is not the DC mode, the processing proceeds to step S112.

In step S112, the horizontal direction interpolation unit 111 and vertical direction interpolation unit 112 determine whether or not the candidate intra prediction mode is the Vertical Prediction mode, Diagonal_Down_Left Prediction mode, or Vertical_Left Prediction mode.

In the event that determination is made in step S112 that the candidate intra prediction mode is the Vertical Prediction mode, Diagonal_Down_Left Prediction mode, or Vertical_Left Prediction mode, the processing proceeds to step S113.

In step S113, the horizontal direction interpolation unit 111 performs interpolation in the horizontal direction according to the candidate intra prediction mode. The horizontal direction interpolation unit 111 supplies information of an interpolated upper adjacent pixel to the optimal mode/optimal shift amount determining unit 102. At this time, the vertical direction interpolation unit 112 does not perform interpolation processing in the vertical direction.

In the event that determination is made in step S112 that the candidate intra prediction mode is not the Vertical Prediction mode, Diagonal_Down_Left Prediction mode, or Vertical_Left Prediction mode, the processing proceeds to step S114.

In step S114, the horizontal direction interpolation unit 111 and vertical direction interpolation unit 112 determine whether the candidate intra prediction mode is the Horizontal Prediction mode or Horizontal_Up Prediction mode. In the event that determination is made in step S114 that the candidate intra prediction mode is the Horizontal Prediction mode or Horizontal_Up Prediction mode, the processing proceeds to step S115.

In step S115, the vertical direction interpolation unit 112 performs interpolation in the vertical direction according to the candidate intra prediction mode. The vertical direction interpolation unit 112 supplies information of an interpolated left adjacent pixel to the optimal mode/optimal shift amount determining unit 102. At this time, the horizontal direction interpolation unit 111 does not perform interpolation processing in the horizontal direction.

In the event that determination is made in step S114 that the candidate intra prediction mode is not the Horizontal Prediction mode or Horizontal_Up Prediction mode, the processing proceeds to step S116.

In step S116, the horizontal direction interpolation unit 111 and vertical direction interpolation unit 112 perform interpolation in the horizontal direction and interpolation in the vertical direction, respectively, in accordance with the candidate intra prediction mode. The horizontal direction interpolation unit 111 and vertical direction interpolation unit 112 supply information regarding the interpolated upper adjacent pixel and left adjacent pixel to the optimal mode/optimal shift amount determining unit 102, respectively.

The encoded compressed image is transmitted via a predetermined transmission path, and decoded by an image decoding device.

[Configuration Example of Image Decoding Device]

Figure 26:
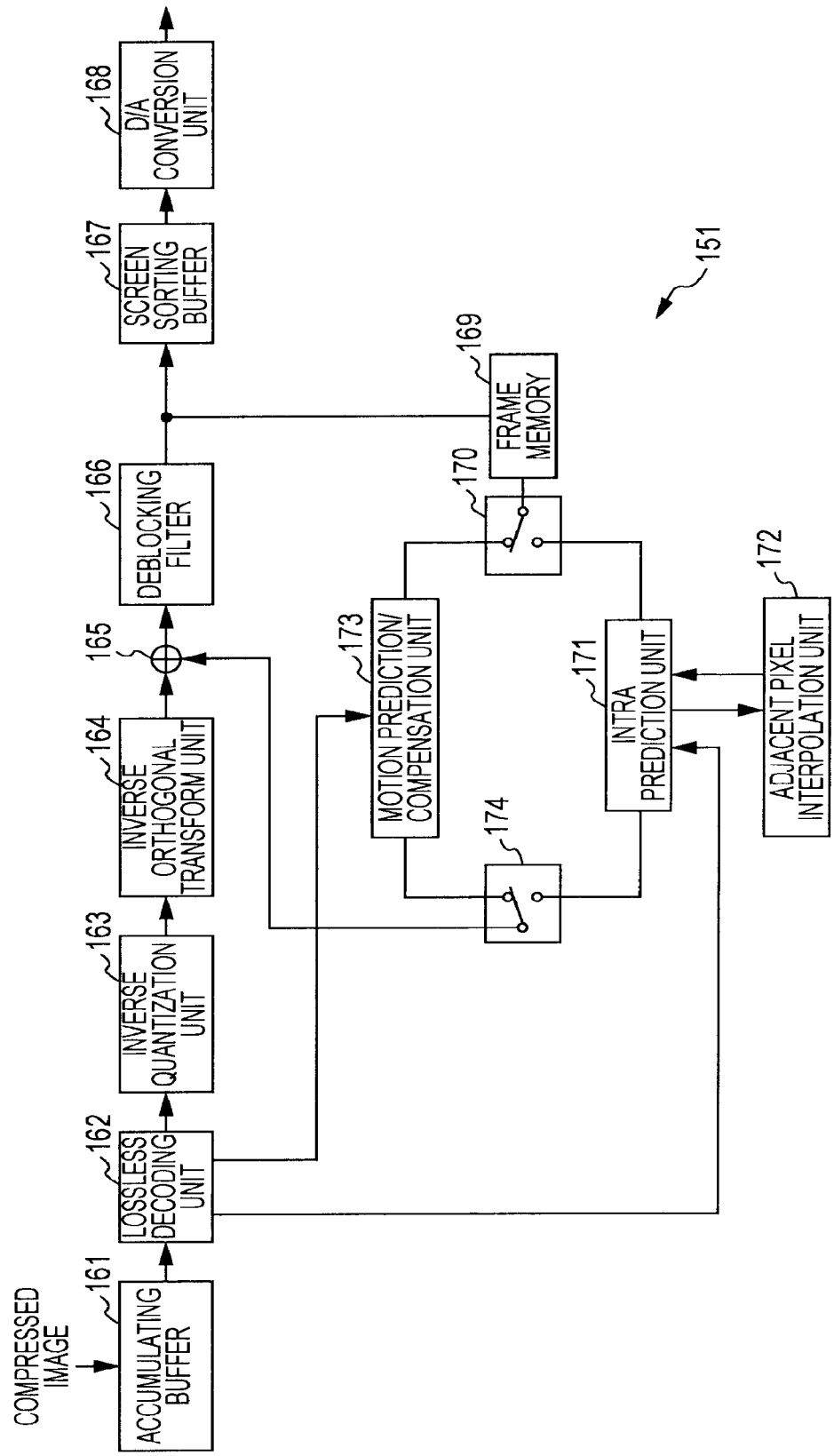
FIG. 26 is a block diagram illustrating the configuration of an embodiment of an image decoding device to which the present invention has been applied.

FIG. 26 represents the configuration of an embodiment of an image decoding device serving as the image processing device to which has been applied.

An image decoding device 151 is configured of an accumulating buffer 161, a lossless decoding unit 162, an inverse quantization unit 163, an inverse orthogonal transform unit 164, a computing unit 165, a deblocking filter 166, a screen sorting buffer 167, a D/A conversion unit 168, frame memory 169, a switch 170, an intra prediction unit 171, an adjacent pixel interpolation unit 172, a motion prediction/compensation unit 173, and a switch 174.

The accumulating buffer 161 accumulates a transmitted compressed image. The lossless decoding unit 162 decodes information supplied from the accumulating buffer 161 and encoded by the lossless encoding unit 66 in FIG. 2 using a system corresponding to the encoding system of the lossless encoding unit 66. The inverse quantization unit 163 subjects the image decoded by the lossless decoding unit 162 to inverse quantization using a system corresponding to the quantization system of the quantization unit 65 in FIG. 2. The inverse orthogonal transform unit 164 subjects the output of the inverse quantization unit 163 to inverse orthogonal transform using a system corresponding to the orthogonal transform system of the orthogonal transform unit 64 in FIG. 2.

The output subject to inverse orthogonal transform is decoded by being added with the prediction image supplied from the switch 174 by the computing unit 165. The deblocking filter 166 removes the block distortion of the decoded image, then supplies to the frame memory 169 for accumulation, and also outputs to the screen sorting buffer 167.

The screen sorting buffer 167 performs sorting of images. Specifically, the sequence of frames sorted for encoding sequence by the screen sorting buffer 62 in FIG. 2 is resorted in the original display sequence. The D/A conversion unit 168 converts the image supplied from the screen sorting buffer 167 from digital to analog, and outputs to an unshown display for display.

The switch 170 reads out an image to be subjected to inter processing and an image to be referenced from the frame memory 169, outputs to the motion prediction/compensation unit 173, and also reads out an image to be used for intra prediction from the frame memory 169, and supplies to the intra prediction unit 171.

Information indicating the intra prediction mode obtained by decoding the header information, and information of the shift amount of an adjacent pixel is supplied from the lossless decoding unit 162 to the intra prediction unit 171. The intra prediction unit 171 also outputs such information to the adjacent pixel interpolation unit 172.

The intra prediction unit 171 causes, based on such information, according to need, the adjacent pixel interpolation unit 172 to shift the phase of the adjacent pixel, generates a prediction image using the adjacent pixel of the adjacent pixel of which the phase has been shifted, and outputs the generated prediction image to the switch 174.

The adjacent pixel interpolation unit 172 shifts the phase of the adjacent pixel in the shift direction according to the intra prediction mode supplied from the intra prediction unit 171 with the shift amount supplied from the intra prediction unit 171. In reality, the adjacent pixel interpolation unit 172 performs linear interpolation by applying the 6-tap FIR filter to the adjacent pixel in the shift direction according to the intra prediction mode, thereby shifting the phase of the adjacent pixel with fractional pixel precision. The adjacent pixel interpolation unit 172 supplies the adjacent pixel of which the phase has been shifted to the intra prediction unit 171.

Information obtained by decoding the header information (prediction mode information, motion vector information, and reference frame information) is supplied from the lossless decoding unit 162 to the motion prediction/compensation unit 173. In the event that information indicating the inter prediction mode has been supplied, the motion prediction/compensation unit 173 subjects the image to motion prediction and compensation processing based on the motion vector information and reference frame information to generate a prediction image. The motion prediction/compensation unit 173 outputs the prediction image generated in the inter prediction mode to the switch 174.

The switch 174 selects the prediction image generated by the motion prediction/compensation unit 173 or intra prediction unit 171, and supplies to the computing unit 165.

[Configuration Example of Intra Prediction Unit and Adjacent Pixel Interpolation Unit]

Figure 27:
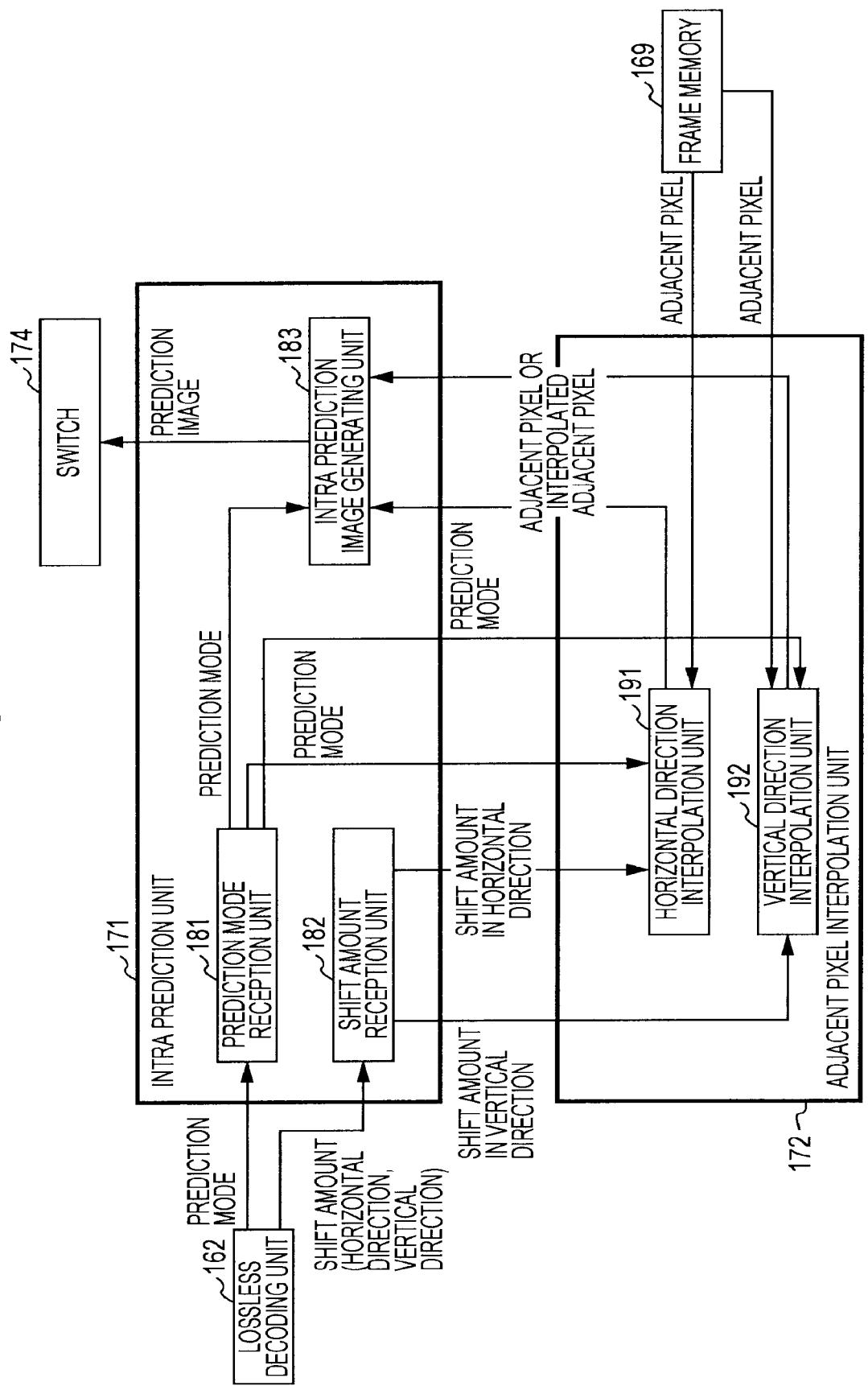
FIG. 27 is a block diagram illustrating another configuration example of the intra prediction unit and the adjacent pixel interpolation unit.

FIG. 27 is a block diagram illustrating a detailed configuration example of the intra prediction unit and adjacent pixel interpolation unit.

In the case of the example in FIG. 27, the intra prediction unit 171 is configured of a prediction mode reception unit 181, a shift amount reception unit 182, and an intra prediction image generating unit 183. The adjacent pixel interpolation unit 172 is configured of a horizontal direction interpolation unit 191 and a vertical direction interpolation unit 192.

The prediction mode reception unit 181 receives the intra prediction mode information decoded by the lossless decoding unit 162. The prediction mode reception unit 181 supplies the received intra prediction mode information to the intra prediction image generating unit 183, horizontal direction interpolation unit 191, and vertical direction interpolation unit 192.

The shift amount reception unit 182 receives the information of the shift amounts (horizontal direction and vertical direction) decoded by the lossless decoding unit 162. The shift amount reception unit 182 supplies, of the received shift amounts, the shift amount in the horizontal direction to the horizontal direction interpolation unit 191, and supplies the shift amount in the vertical direction to the vertical direction interpolation unit 192.

The information of the intra prediction mode received by the prediction mode reception unit 181 is input to the intra prediction image generating unit 183. Also, the information of the upper adjacent pixel or interpolated upper adjacent pixel from the horizontal direction interpolation unit 191, and the information of the left adjacent pixel or interpolated left adjacent pixel from the vertical direction interpolation unit 192 are input to the intra prediction image generating unit 183.

The intra prediction image generating unit 183 performs intra prediction in the prediction mode that the input intra prediction mode information indicates using the pixel value of the adjacent pixel or interpolated adjacent pixel to generate a prediction image, and outputs the generated prediction image to the switch 174.

The horizontal direction interpolation unit 191 reads out an upper adjacent pixel from the frame memory 169 according to the prediction mode from the prediction mode reception unit 181. The horizontal direction interpolation unit 191 shifts the phase of the read upper adjacent pixel with the shift amount in the horizontal direction from the shift amount reception unit 182 by the 6-tap FIR filter and linear interpolation. The information of the interpolated upper adjacent pixel or non-interpolated upper adjacent pixel (i.e., adjacent pixel from the frame memory 169) is supplied to the intra prediction image generating unit 183. In the case of FIG. 27, drawing of the switch 170 is omitted, but the adjacent pixel is read out from the frame memory 169 via the switch 170.

The vertical direction interpolation unit 192 reads out a left adjacent pixel from the frame memory 169 according to the prediction mode from the prediction mode reception unit 181. The vertical direction interpolation unit 192 shifts the phase of the read left adjacent pixel with the shift amount in the vertical direction from the shift amount reception unit 182 by the 6-tap FIR filter and linear interpolation. The information of the linearly interpolated left adjacent pixel or non-interpolated left adjacent pixel (i.e., adjacent pixel from the frame memory 169) is supplied to the intra prediction image generating unit 183.

[Description of Decoding Processing of Image Decoding Device]

Figure 28:
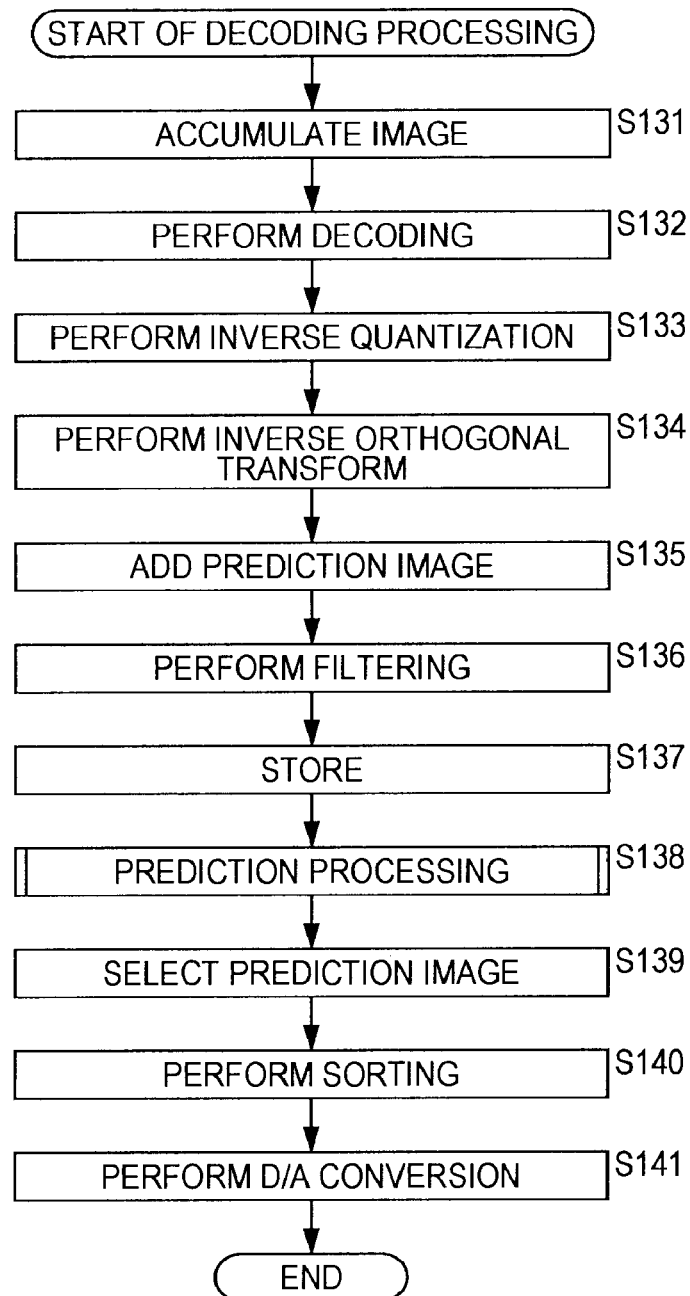
FIG. 28 is a flowchart for describing the decoding processing of the image decoding device in FIG. 26.

Next, the decoding processing that the image decoding device 151 executes will be described with reference to the flowchart in FIG. 28.

In step S131, the accumulating buffer 161 accumulates the transmitted image. In step 3132, the lossless decoding unit 162 decodes the compressed image supplied from the accumulating buffer 161. Specifically, the I picture, P picture, and B picture encoded by the lossless encoding unit 66 in FIG. 2 are decoded.

At this time, the motion vector information, reference frame information, prediction mode information (information indicating the intra prediction mode or inter prediction mode), flag information, shift amount information, and so forth are also decoded.

Specifically, in the event that the prediction mode information is intra prediction mode information, the prediction mode information and shift amount information are supplied to the intra prediction unit 171. In the event that the prediction mode information is inter prediction mode information, motion vector information and reference frame information corresponding to the prediction mode information are supplied to the motion prediction/compensation unit 173.

In step S133, the inverse quantization unit 163 inversely quantizes the transform coefficient decoded by the lossless decoding unit 162 using a property corresponding to the property of the quantization unit 65 in FIG. 2. In step S134, the inverse orthogonal transform unit 164 subjects the transform coefficient inversely quantized by the inverse quantization unit 163 to inverse orthogonal transform using a property corresponding to the property of the orthogonal transform unit 64 in FIG. 2. This means that difference information corresponding to the input of the orthogonal transform unit 64 in FIG. 2 (the output of the computing unit 63) has been decoded.

In step S135, the computing unit 165 adds the prediction image selected in the processing in later-described step S141 and input via the switch 174, to the difference information. Thus, the original image is decoded. In step S136, the deblocking filter 166 subjects the image output from the computing unit 165 to filtering. Thus, block distortion is removed. In step S137, the frame memory 169 stores the image subjected to filtering.

In step S138, the intra prediction unit 171 and motion prediction/compensation unit 173 perform the corresponding image prediction processing in response to the prediction mode information supplied from the lossless decoding unit 162.

Specifically, in the event that the intra prediction mode information has been supplied from the lossless decoding unit 162, the intra prediction unit 171 performs the intra prediction processing in the intra prediction mode. At this time, the intra prediction unit 171 performs intra prediction processing using the adjacent pixel of which the phase has been shifted in the shift direction according to the intra prediction mode with the shift amount supplied from the lossless decoding unit 162.

Figure 29:
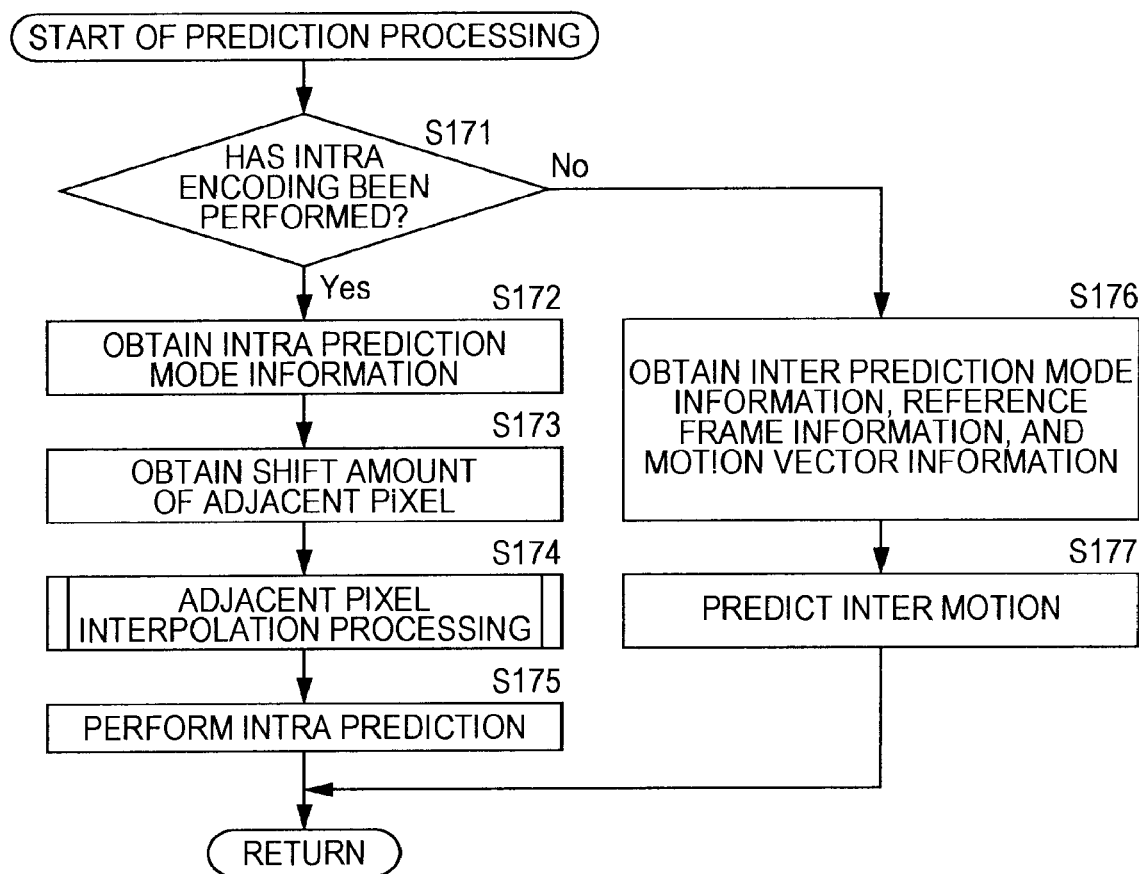
FIG. 29 is a flowchart for describing prediction processing in step S138 in FIG. 28.

The details of the prediction processing in step S138 will be described later with reference to FIG. 29, but according to this processing, the prediction image generated by the intra prediction unit 171 or the prediction image generated by the motion prediction/compensation unit 173 is supplied to the switch 174.

In step S139, the switch 174 selects the prediction image. Specifically, the prediction image generated by the intra prediction unit 171 or the prediction image generated by the motion prediction/compensation unit 173 is supplied. Accordingly, the supplied prediction image is selected, supplied to the computing unit 165, and in step S134, as described above, added to the output of the inverse orthogonal transform unit 164.

In step S140, the screen sorting buffer 167 performs sorting. Specifically, the sequence of frames sorted for encoding by the screen sorting buffer 62 of the image encoding device 51 is sorted in the original display sequence.

In step S141, the D/A conversion unit 168 converts the image from the screen sorting buffer 167 from digital to analog. This image is output to an unshown display, and the image is displayed.

[Description of Prediction Processing]

Next, the prediction processing in step S138 in FIG. 28 will be described with reference to the flowchart in FIG. 29.

In step S171, the prediction mode reception unit 181 determines whether or not the current block has been subjected to intra encoding. Upon the intra prediction mode information being supplied from the lossless decoding unit 162 to the prediction mode reception unit 181, in step S171 the prediction mode reception unit 181 determines that the current block has been subjected to intra encoding, and the processing proceeds to step S172.

in step S172, the prediction mode reception unit 181 receives and obtains the intra prediction mode information from the lossless decoding unit 162. The prediction mode reception unit 181 supplies the received intra prediction mode information to the intra prediction image generating unit 183, horizontal direction interpolation unit 191, and vertical direction interpolation unit 192.

In step S173, the shift amount reception unit 182 receives and obtains the information of the shift amounts (horizontal direction and vertical direction) of the adjacent pixel decoded by the lossless decoding unit 162. The shift amount reception unit 182 supplies, of the received shift amounts, the shift amount in the horizontal direction to the horizontal direction interpolation unit 191, and supplies the shift amount in the vertical direction to the vertical direction interpolation unit 192.

The horizontal direction interpolation unit 191 and vertical direction interpolation unit 192 read out an adjacent pixel from the frame memory 169, and in step S174 execute the adjacent pixel interpolation processing. The details of the adjacent interpolation processing in step S174 is basically the same processing as the adjacent interpolation processing described above with reference to FIG. 25, and accordingly, description and illustration thereof will be omitted.

According to this processing, the adjacent pixel interpolated in the shift direction according to the intra prediction mode from the prediction mode reception unit 181, or the adjacent pixel not interpolated according to the intra prediction mode is supplied to the intra prediction image generating unit 183.

Specifically, in the event that the intra prediction mode is the mode 2 (DC prediction), the horizontal direction interpolation unit 191 and vertical direction interpolation unit 192 supply the upper and left adjacent pixels read out from the frame memory 169 to the intra prediction image generating unit 183 without performing interpolation of the adjacent pixels.

In the event that the intra prediction mode is the mode 0 (Vertical prediction), mode 3 (Diagonal_Down_Left prediction), or mode 7 (Vertical_Left prediction), only interpolation in the horizontal direction will be performed. Specifically, the horizontal direction interpolation unit 191 interpolates the upper adjacent pixel read out from the frame memory 169 with the shift amount in the horizontal direction from the shift amount reception unit 182, and supplies the interpolated upper adjacent pixel to the intra prediction image generating unit 183. At this time, the vertical direction interpolation unit 192 supplies the left adjacent pixel read out from the frame memory 169 to the intra prediction image generating unit 183 without performing interpolation of the left adjacent pixel.

In the event that the intra prediction mode is the mode 1 (Horizontal prediction) or mode 8 (Horizontal_Up prediction), only interpolation in the vertical direction will be performed. Specifically, the vertical direction interpolation unit 192 interpolates the left adjacent pixel read out from the frame memory 169 with the shift amount in the vertical direction from the shift amount reception unit 182, and supplies the interpolated left adjacent pixel to the intra prediction image generating unit 183. At this time, the horizontal direction interpolation unit 191 supplies the upper adjacent pixel read out from the frame memory 169 to the intra prediction image generating unit 183 without performing interpolation of the upper adjacent pixel.

In the event that the intra prediction mode is other prediction modes, interpolation in the horizontal direction and vertical direction will be performed. Specifically, the horizontal direction interpolation unit 191 interpolates the upper adjacent pixel read out from the frame memory 169 with the shift amount in the horizontal direction from the shift amount reception unit 182, and supplies the interpolated upper adjacent pixel to the intra prediction image generating unit 183. The vertical direction interpolation unit 192 interpolates the left adjacent pixel read out from the frame memory 169 with the shift amount in the vertical direction from the shift amount reception unit 182, and supplies the interpolated left adjacent pixel to the intra prediction image generating unit 183.

In step S175, the intra prediction image generating unit 183 performs intra prediction in the prediction mode that the input intra prediction mode information indicates using the pixel values of the adjacent pixels or interpolated adjacent pixels from the horizontal direction interpolation unit 191 and vertical direction interpolation unit 192. According to this intra prediction, a prediction image is generated, and the generated prediction image is output to the switch 174.

On the other hand, in the event that determination is made in step S171 that the current block has not been subjected to intra encoding, the processing proceeds to step S176.

In the event that the image to be processed is an image to be subjected to inter processing, the inter prediction mode information, reference frame information, and motion vector information are supplied from the lossless decoding unit 162 to the motion prediction/compensation unit 173. In step 3176, the motion prediction/compensation unit 173 obtains the inter prediction mode information, reference frame information, motion vector information, and so forth from the lossless decoding unit 162.

In step S177, the motion prediction/compensation unit 173 performs inter motion prediction. Specifically, in the event that the image to be processed is an image to be subjected to inter prediction processing, a necessary image is read out from the frame memory 169, and supplied to the motion prediction/compensation unit 173 via the switch 170. In step S177, the motion prediction/compensation unit 173 performs motion prediction in the inter prediction mode to generate a prediction image based on the motion vector obtained in step S176. The generated prediction image is output to the switch 174.

As described above, with the image encoding device 51, a pixel with fractional pixel precision is obtained by the 6-tap FIR filter and linear interpolation, and the optimal shift amount is determined, whereby choices of pixel values to be used in the intra prediction mode can be increased. Thus, the optimal intra prediction can be performed, and encoding efficiency in the intra prediction can further be improved.

Also, with the H.264/AVC system, the circuit of a 6-tap FIR filter only used for inter motion prediction compensation that has been described above with reference to FIG. 4 can also effectively be used for intra prediction. Thus, efficiency can be improved without increasing the circuit.

Further, there can be performed intra prediction with further finer resolution than 22.5 degrees that is resolution for intra prediction determined in the H.264/AVC system.

Note that, with the image encoding device 51, unlike the proposal described in NPL 2, only a pixel adjacent to the current block to be used for intra prediction of the H.264/AVC system with a predetermined position is used for intra prediction. That is to say, the pixel to be read out to the adjacent pixel buffer 81 may be an adjacent pixel alone.

Accordingly, increase in the number of times of memory access and processing due to pixels other an adjacent pixel of the block to be encoded being used in the proposal of NPL 2, i.e., deterioration in processing efficiency can be prevented.

Note that, with the above description, the case of the intra 4×4 prediction mode for luminance signals have been described as an example of the adjacent pixel interpolation processing, but the present invention may also be applied to the cases of the intra 8×8 and intra 16×16 prediction modes. Also, the present invention may be applied to the case of the intra prediction modes for color difference signals.

Note that in the event of the intra 8×8 prediction mode, in the same way as with the case of the intra 4×4 prediction mode, average value processing is performed regarding the mode 2 (DC prediction mode). Accordingly, even when performing shift, this does not directly get involved with improvement in encoding efficiency, and accordingly, the above-mentioned operations are inhibited and not performed.

With regard to the mode 0 (Vertical Prediction mode), mode 3 (Diagonal_Down_Left Prediction mode), or mode 7 (Vertical_Left Prediction mode), shift only with the upper adjacent pixels $A_0$, $A_1$, $A_2$, and so on in FIG. 18 serves as a candidate.

With regard to the mode 1 (Horizontal Prediction mode) or mode 8 (Horizontal_Up Prediction mode), shift only with the left adjacent pixels $I_0$, $I_1$, $I_2$, and so on in FIG. 18 serves as a candidate.

With regard to the other modes (modes 4 through 6), shift has to be taken into consideration regarding both of the upper adjacent pixels and left adjacent pixels.

Also, in the event of the intra 16×16 prediction mode and the intra prediction mode for color difference signals, with regard to the Vertical Prediction mode, only shift in the horizontal direction of upper adjacent pixels is performed. With regard to the Horizontal Prediction mode, only shift in the vertical direction of left adjacent pixels is performed. With regard to the DC Prediction mode, no shift processing is performed. With regard to the Plane Prediction mode, both of shift in the horizontal direction of upper adjacent pixels, and shift in the vertical direction of left adjacent pixels are performed.

Further, as described in NPL 1, in the event that interpolation processing with ⅛ pixel precision is performed in motion prediction, with the present invention as well, interpolation processing with ⅛ pixel precision is performed.

Description has been made so far with the H.264/AVC system employed as a coding system, but the present invention is not restricted to this, and another coding system/decoding system for performing intra prediction using adjacent pixels may be employed.

Note that the present invention may be applied to an image encoding device and an image decoding device used at the time of receiving image information (bit streams) compressed by orthogonal transform such as discrete cosine transform or the like and motion compensation via a network medium such as satellite broadcasting, a cable television, the Internet, a cellular phone, or the like, for example, as with MPEG, H.26x, or the like. Also, the present invention may be applied to an image encoding device and an image decoding device used at the time of processing image information on storage media such as an optical disc, a magnetic disk, and flash memory. Further, the present invention may be applied to a motion prediction compensation device included in such an image encoding device and an image decoding device and so forth.

The above-mentioned series of processing may be executed by hardware, or may be executed by software. In the event of executing the series of processing by software, a program making up the software thereof is installed in a computer. Here, examples of the computer include a computer built into dedicated hardware, and a general-purpose personal computer whereby various functions can be executed by various types of programs being installed thereto.

FIG. 30 is a block diagram illustrating a configuration example of the hardware of a computer which executes the above-mentioned series of processing using a program.

With the computer, a CPU (Central Processing Unit) 301, ROM (Read Only Memory) 302, and RAM (Random Access Memory) 303 are mutually connected by a bus 304.

Further, an input/output interface 305 is connected to the bus 304. An input unit 306, an output unit 307, a storage unit 308, a communication unit 309, and a drive 310 are connected to the input/output interface 305.

The input unit 306 is made up of a keyboard, a mouse, a microphone, and so forth. The output unit 307 is made up of a display, a speaker, and so forth. The storage unit 308 is made up of a hard disk, nonvolatile memory, and so forth. The communication unit 309 is made up of a network interface and so forth. The drive 310 drives a removable medium 311 such as a magnetic disk, an optical disc, a magneto-optical disk, semiconductor memory, or the like.

With the computer thus configured, for example, the CPU 301 loads a program stored in the storage unit 308 to the RAM 303 via the input/output interface 305 and bus 304, and executes the program, and accordingly, the above-mentioned series of processing is performed.

The program that the computer (CPU 301) executes may be provided by being recorded in the removable medium 311 serving as a package medium or the like, for example. Also, the program may be provided via a cable or wireless transmission medium such as a local area network, the Internet, or digital broadcasting.

With the computer, the program may be installed in the storage unit 308 via the input/output interface 305 by mounting the removable medium 311 on the drive 310. Also, the program may be received by the communication unit 309 via a cable or wireless transmission medium, and installed in the storage unit 308. Additionally, the program may be installed in the ROM 302 or storage unit 308 beforehand.

Note that the program that the computer executes may be a program wherein the processing is performed in the time sequence along the sequence described in the present Specification, or may be a program wherein the processing is performed in parallel or at necessary timing such as when call-up is performed.

The embodiments of the present invention are not restricted to the above-mentioned embodiment, and various modifications may be made without departing from the essence of the present invention.

REFERENCE SIGNS LIST 51 image encoding device
66 lossless encoding unit
74 intra prediction unit
75 adjacent pixel interpolation unit
76 motion prediction/compensation unit
77 prediction image selecting unit 81 adjacent pixel buffer
82 optimal mode determining unit
83 optimal shift amount determining unit
84 prediction image generating unit
91 mode determining unit
92 horizontal direction interpolation unit
93 vertical direction interpolation unit
151 image decoding device
162 lossless decoding unit
171 intra prediction unit
172 adjacent pixel interpolation unit
173 motion prediction/compensation unit
174 switch
181 prediction mode reception unit
182 shift amount reception unit
183 intra prediction image generating unit
191 horizontal direction interpolation unit
192 vertical direction interpolation unit

The invention claimed is:

1. An image processing device, comprising:
a selecting section configured to select, according to a prediction mode when performing intra prediction on a pixel of an object block to be an object of encoding processing by using an image subjected to encoding processing as the object, whether to shift a phase of an adjacent pixel to be referenced when performing the intra prediction on the pixel of the object block or not to shift the phase of the adjacent pixel; and
an intra predicting section configured to perform the intra prediction on the pixel of the object block by using the adjacent pixel,
wherein the selecting section selects, according to a direction of the prediction mode when performing the intra prediction, whether to shift a phase of an upper adjacent pixel adjacent to an upper portion of the object block along a horizontal direction or to shift a phase of a left adjacent pixel adjacent to a left portion of the object block along a vertical direction,
wherein, when the direction of the prediction mode includes only the horizontal direction, the selection section selects shifting the phase in the vertical direction of the left adjacent pixel adjacent to the left portion of the object block, and
wherein the selecting section and the intra predicting section are each implemented via at least one processor.

2. The image processing device according to claim 1, wherein
the selecting section is further configured to select, according to the prediction mode when performing the intra prediction, whether to shift the phase of the upper adjacent pixel along the horizontal direction or not to shift the phase of the upper adjacent pixel along the horizontal direction.

3. The image processing device according to claim 1, wherein
the selecting section is further configured to select, according to the prediction mode when performing the intra prediction, whether to shift the phase of the left adjacent pixel along the vertical direction or not to shift the phase of the left adjacent pixel along the vertical direction.

4. The image processing device according to claim 1, wherein
the selecting section is further configured to not shift the phase of the adjacent pixel in a case of performing the intra prediction using an average value of the adjacent pixel.

5. The image processing device according to claim 1, wherein
the selecting section is further configured to shift the phase of the adjacent pixel to a position with fractional pixel precision in a case of selecting to shift the phase of the adjacent pixel.

6. The image processing device according to claim 5, wherein
the selecting section is further configured to shift the adjacent pixel to the position with fractional pixel precision by using an interpolation method used when performing movement compensation with fractional pixel precision.

7. The image processing device according to claim 6, wherein
the selecting section is further configured to shift the adjacent pixel by using an interpolation filter used when performing the movement compensation with fractional pixel precision.

8. The image processing device according to claim 5, wherein
the selecting section is further configured to shift the phase of the adjacent pixel by using linear interpolation processing with fractional pixel precision.

9. The image processing device according to claim 5, wherein
the selecting section is further configured to shift the phase of the adjacent pixel by using an interpolation filter used when performing movement compensation with fractional pixel precision and linear interpolation processing with fractional pixel precision.

10. The image processing device according to claim 5, wherein
the selecting section is further configured to shift the phase of the adjacent pixel to a position with pixel precision of ¼ pixel precision or less.

11. The image processing device according to claim 1, further comprising
an encoding section configured to perform the encoding processing on the image by using a prediction image generated by the intra prediction section,
wherein the encoding section is implemented via at least one processor.

12. An image processing method, comprising:
selecting, according to a prediction mode when performing intra prediction on a pixel of an object block to be an object of encoding processing by using an image subjected to encoding processing as the object, whether to shift a phase of an adjacent pixel to be referenced when performing the intra prediction on the pixel of the object block or not to shift the phase of the adjacent pixel; and
performing the intra prediction on the pixel of the object block by using the adjacent pixel,
wherein, the selection of whether to shift the phase of an adjacent pixel includes selecting, according to a direction of the prediction mode when performing the intra prediction, whether to shift a phase of an upper adjacent pixel adjacent to an upper portion of the object block along a horizontal direction or to shift a phase of a left adjacent pixel adjacent to a left portion of the object block along a vertical direction,
wherein, the selection of whether to shift the phase of an adjacent pixel includes, when the direction of the prediction mode includes only the horizontal direction, selecting to shift the phase in the vertical direction of the left adjacent pixel adjacent to the left portion of the object block.

13. A non-transitory computer-readable medium having embodied thereon a program, which when executed by a computer causes the computer to execute a method, the method comprising:

selecting, according to a prediction mode when performing intra prediction on a pixel of an object block to be an object of encoding processing by using an image subjected to encoding processing as the object, whether to shift a phase of an adjacent pixel to be referenced when performing the intra prediction on the pixel of the object block or not to shift the phase of the adjacent pixel; and performing the intra prediction on the pixel of the object block by using the adjacent pixel, wherein, the selection of whether to shift the phase of an adjacent pixel includes selecting, according to a direction of the prediction mode when performing the intra prediction, whether to shift a phase of an upper adjacent pixel adjacent to an upper portion of the object block along a horizontal direction or to shift a phase of a left adjacent pixel adjacent to a left portion of the object block along a vertical direction, wherein, the selection of whether to shift the phase of an adjacent pixel includes, when the direction of the prediction mode includes only the horizontal direction, selecting to shift the phase in the vertical direction of the left adjacent pixel adjacent to the left portion of the object block.

* * * * *